United States Patent
Yato

(10) Patent No.: US 8,874,176 B2
(45) Date of Patent: *Oct. 28, 2014

(54) INFORMATION PROCESSING DEVICE, POSITION RECORDING METHOD, AND PROGRAM

(75) Inventor: Chitoku Yato, Kanagawa (JP)

(73) Assignee: Sony Corporation, Tokyo (JP)

( * ) Notice: Subject to any disclaimer, the term of this patent is extended or adjusted under 35 U.S.C. 154(b) by 178 days.

This patent is subject to a terminal disclaimer.

(21) Appl. No.: 13/268,079

(22) Filed: Oct. 7, 2011

(65) Prior Publication Data

US 2012/0122493 A1     May 17, 2012

(30) Foreign Application Priority Data

Nov. 17, 2010   (JP) ................................. 2010-257242

(51) Int. Cl.
| | |
|---|---|
| *H04B 1/38* | (2006.01) |
| *H04M 1/00* | (2006.01) |
| *G01S 19/34* | (2010.01) |
| *H04W 24/10* | (2009.01) |
| *H04W 52/02* | (2009.01) |

(52) U.S. Cl.
CPC ............... *G01S 19/34* (2013.01); *H04W 24/10* (2013.01); *H04W 52/0254* (2013.01)
USPC ...................... 455/574; 455/456.1; 455/456.6; 370/311

(58) Field of Classification Search
CPC ........ G01S 19/34; H04W 64/00; H04W 4/02; H04W 4/023; H04W 4/021; H04W 4/025
USPC .......... 455/404.2, 456.1, 456.3, 456.4, 456.6, 455/457, 574; 370/311

See application file for complete search history.

(56) References Cited

U.S. PATENT DOCUMENTS

| | | | |
|---|---|---|---|
| 6,636,158 B1 | 10/2003 | Bando et al. | |
| 2005/0219120 A1* | 10/2005 | Chang | 342/357.13 |
| 2006/0267837 A1* | 11/2006 | Haberkern | 342/357.06 |
| 2006/0282472 A1* | 12/2006 | Ng et al. | 707/200 |
| 2008/0001815 A1* | 1/2008 | Wang et al. | 342/357.07 |
| 2008/0020781 A1* | 1/2008 | Cho | 455/456.1 |
| 2009/0102653 A1* | 4/2009 | McGinnis et al. | 340/551 |
| 2011/0250871 A1* | 10/2011 | Huang et al. | 455/412.2 |

FOREIGN PATENT DOCUMENTS

JP     2001-91290     4/2001

\* cited by examiner

*Primary Examiner* — Magdi Elhag
(74) *Attorney, Agent, or Firm* — Oblon, Spivak, McClelland, Maier & Neustadt, L.L.P.

(57) ABSTRACT

An information processing device includes a main function unit which realizes main functions of the information processing device and is operated by being switched between a normal operation mode and a power-saving mode in which less power is consumed than in the normal operation mode, a position acquisition unit which acquires positional information indicating the current position, and a logging controller which causes a first storage unit to record movement trace information obtained by making the positional information acquired by the position acquisition unit correspond to the time when the positional information is acquired in the state where the main function unit is switched to the power-saving mode.

10 Claims, 26 Drawing Sheets

INFORMATION PROCESSING DEVICE, POSITION RECORDING METHOD, AND PROGRAM

BACKGROUND

The present disclosure relates to an information processing device, a position recording method, and a program, and particularly to an information processing device, a position recording method, and a program that can be used in recording positions while reducing power consumption.

In recent years, devices with a function of acquiring positional information mainly in portable digital equipment have been distributed. A route to the destination can be guided to in, for example, navigation devices, mobile telephones, and the like, using such acquired positional information. In addition, in digital cameras, the place where a video is captured can be recognized using acquired positional information.

In addition, the function of acquiring positional information is mounted in portable compact digital equipment, and the history of positional information is becoming important information to ascertain actions of a user. For this reason, devices which make positional information correspond to time information to be recorded as movement trace information are being introduced. Japanese Unexamined Patent Application Publication No. 2001-091290 discloses a GPS (Global Positioning System) device with a function of recording positional information.

SUMMARY

If recording of movement trace information is regularly performed for a long period of time, however, it is problematic in that the amount of power consumption escalates. For this reason, the GPS device described in Japanese Unexamined Patent Application Publication No. 2001-091290 above was a device dedicated to position recording. However, separately carrying a device only for recording movement trace information is cumbersome for users. For this reason, a technique of recording positional information while reducing power consumption has been demanded as an additional function for existing devices, such as navigation devices, mobile telephones, digital cameras, and the like, which are equipped with their main functions.

Thus, the present disclosure takes the above problem into consideration, and it is desirable to provide an information processing device, a position recording method, and a program which are novel and improved, and enable recording of positional information while reducing power consumption.

In order to solve the above problem, according to an embodiment of the present disclosure, there is provided an information processing device including a main function unit which realizes main functions of the information processing device and is operated by being switched between a normal operation mode and a power-saving mode in which less power is consumed than in the normal operation mode, a position acquisition unit which acquires positional information indicating the current position, and a logging controller which causes a first storage unit to record movement trace information obtained by making the positional information acquired by the position acquisition unit correspond to the time when the positional information is acquired in the state where the main function unit is switched to the power-saving mode.

According to the configuration, it is possible to record movement trace information in the state where the main function unit is in the power-saving mode. For this reason, power consumption necessary for recording the movement trace information by the information processing device is reduced. In other words, recording duration in which the movement trace information can be recorded with a predetermined amount of electric power is lengthened. Accordingly, in application of an information processing device driven by batteries, it is possible to perform recording of the movement trace information while reducing influence on the amount of electric power for using functions realized by the main function unit.

In addition, the information processing device may further include a detection unit which is a sensor that senses the movement of the information processing device, and when the logging controller detects that the current position is not changed for a predetermined time or longer based on the positional information acquired by the position acquisition unit, the logging controller may stop recording of the movement trace information by cutting power supply to the position acquisition unit until the detection unit detects the movement of the information processing device.

In addition, the logging controller may have the normal operation mode and the power-saving mode, and when the movement trace information is not recorded, the logging controller may be switched to the power-saving mode.

In addition, the information processing device may further include a light emitting unit which turns on and off in a cycle according to the recording frequency of the movement trace information.

In addition, the main function unit may set information of a notification point which is set as a point where a user wants to be notified in the logging controller before the main function unit is switched to the power saving mode, and the logging controller may switch the main function unit to the normal operation mode when the current position of the information processing device gets near to the notification point within a predetermined range.

In addition, when the main function unit is switched to the normal operation mode after the logging controller detects that the current position is within the predetermined range of the notification point, the main function unit may include a notification unit which notifies that the current position gets near to the notification point.

In addition, when the main function unit is switched to the normal operation mode after the logging controller records the movement trace information in the power-saving mode, the main function unit causes a screen including the analysis result of the movement trace information stored in the first storage unit to be displayed.

In addition, when space capacity of the first storage unit is equal to or lower than a predetermined threshold value before the main function unit is switched to the power-saving mode, the main function unit may duplicate and store the movement trace information stored in the first storage unit in a second storage unit, and erase the movement trace information stored in the first storage unit.

In addition, in order to solve the above problem, according to another embodiment of the disclosure, there is provided a position recording method including setting of an acquisition frequency of movement trace information obtained by making positional information indicating the current position correspond to the time when the positional information is acquired in a logging controller by a main controller included in a main function unit which has a normal operation mode and a power-saving mode in which less power is consumed than in the normal operation mode and realizes main functions of an information processing device, switching the main function unit to the power-saving mode by the main controller, acquiring the positional information by the logging controller in the state where the main function unit is switched to the power-saving mode, and causing the movement trace information to be recorded by the logging controller based on the acquired positional information.

In addition, in order to solve the above problem, according to still another embodiment of the disclosure, there is provided a program which causes a computer to function as an information processing device including a main function unit which has a normal operation mode and a power-saving mode in which less power is consumed than in the normal operation mode and realizes operations of main functions of the information processing device, a position acquisition unit which acquires positional information indicating the current position, and a logging controller which causes a first storage unit to record movement trace information obtained by making the positional information acquired by the position acquisition unit correspond to the time when the positional information is acquired in the state where the main function unit is switched to the power-saving mode.

According to the embodiments of the present disclosure described above, it is possible to record movement trace information while reducing power consumption.

DETAILED DESCRIPTION OF EMBODIMENTS

Figure 1:
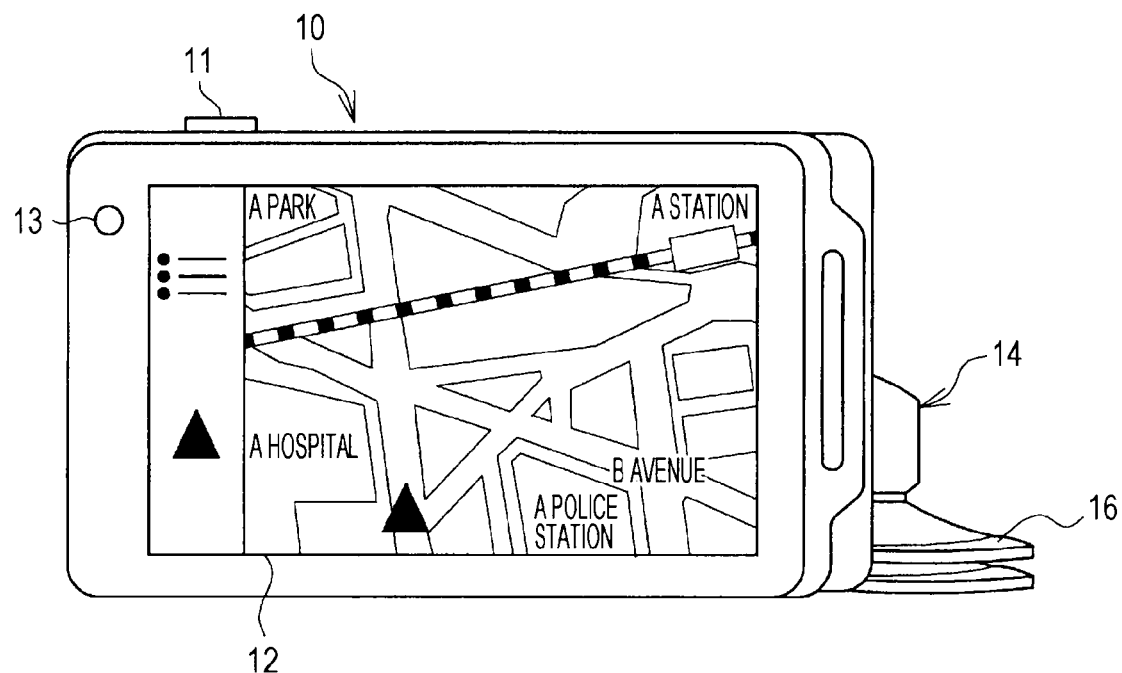
FIG. 1 is an appearance diagram of a PND according to first and second embodiments of the present disclosure.

Hereinafter, embodiments of the disclosure will be described in detail with reference to accompanying drawings. Furthermore, in the present specification and drawings, constituent elements having substantially the same functional configurations will be given the same reference numerals, thereby omitting overlapping description. Furthermore, description will be provided in the following order.

1. First Embodiment
1-1. Configuration
1-2. Operation Mode
1-3. First Operation Example
1-4. Second Operation Example
2. Second Embodiment (Example of operation in a power-saving mode switched from a dedicated logging mode)
2-1. Configuration
2-2. Operation Mode
2-3. Operation Example
3. Command Use Example <1. First Embodiment>

[1-1. Configuration]

Figure 2:
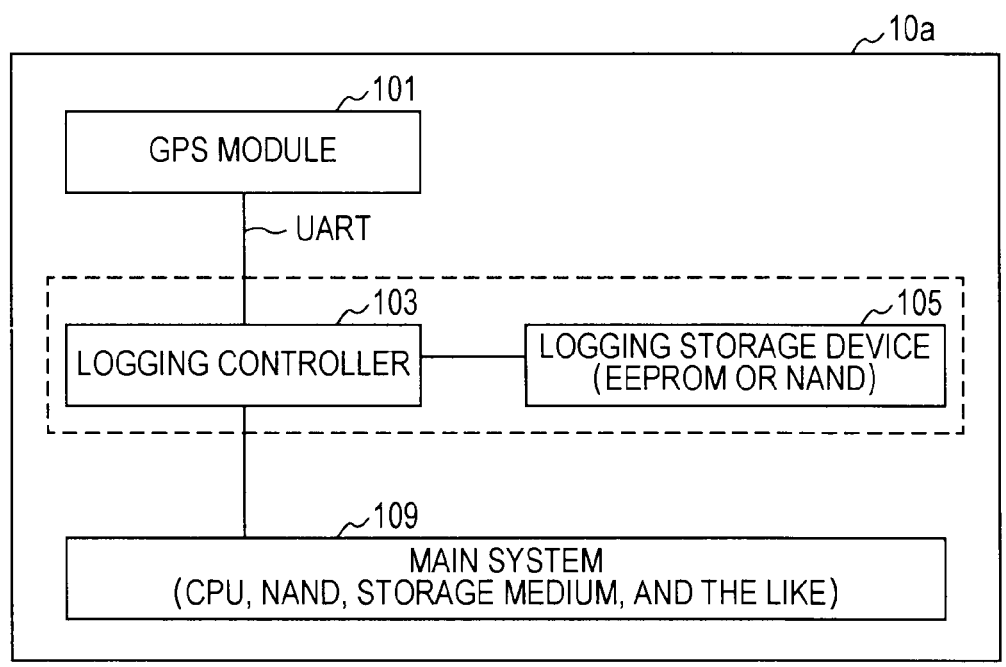
FIG. 2 is a functional block diagram of the PND according to the first embodiment of the disclosure.
Figure 3:
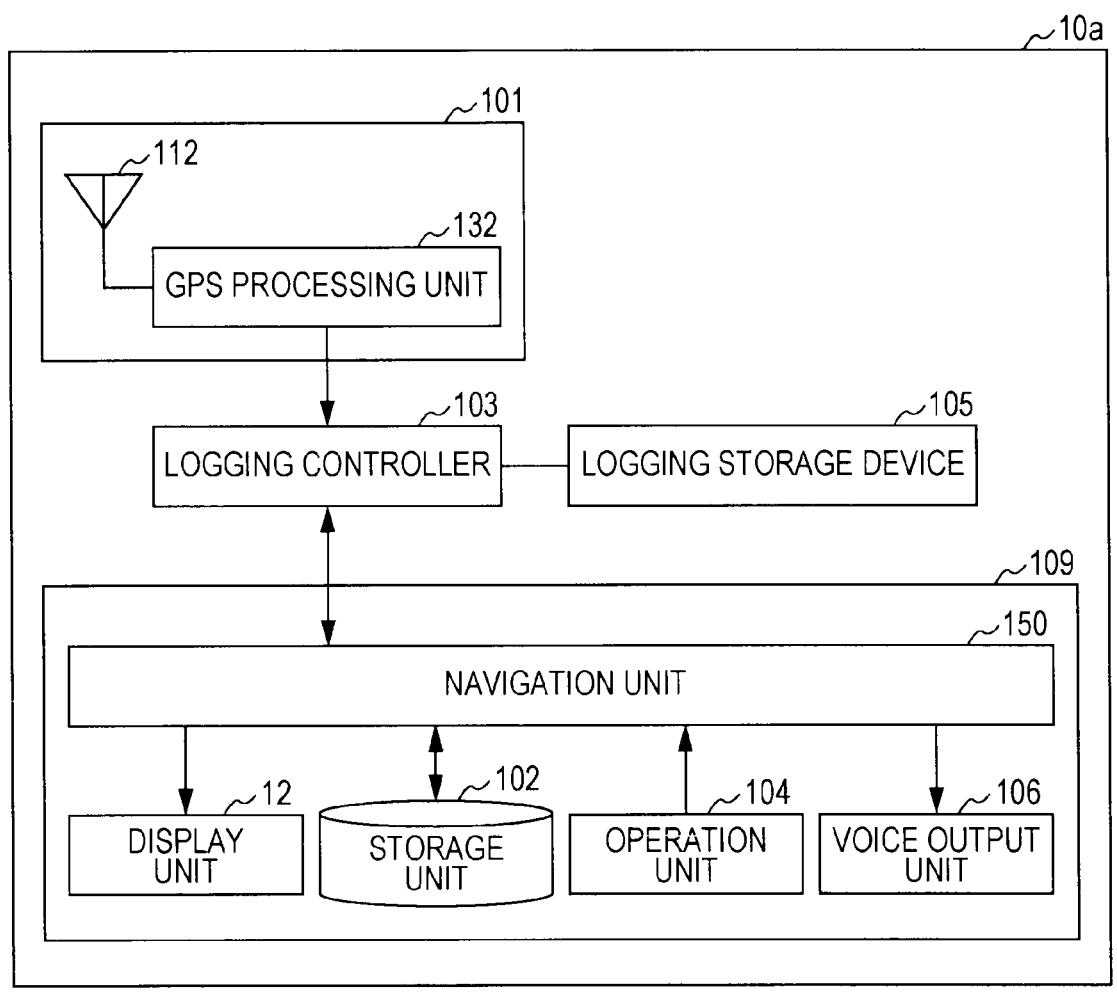
FIG. 3 is a block diagram showing the functional block diagram of FIG. 2 in further detail.
Figure 29:
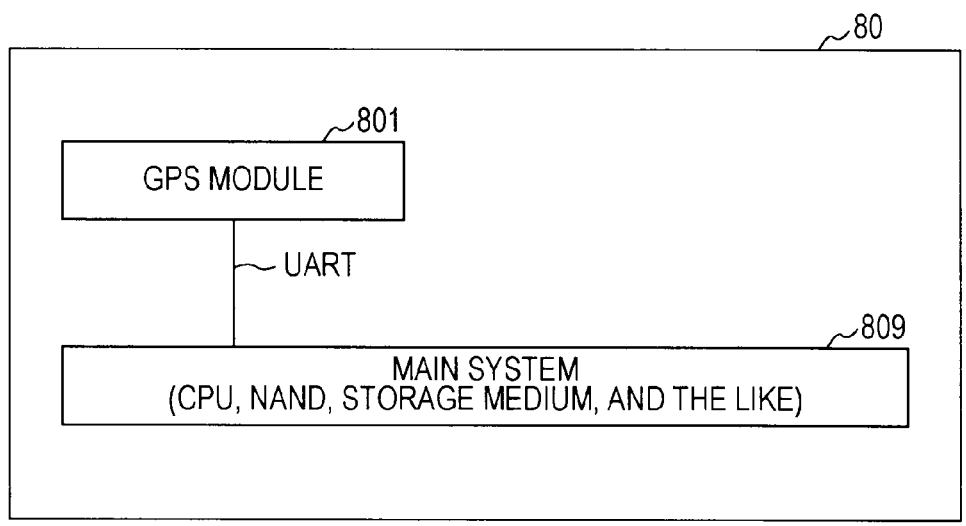
FIG. 29 is a block diagram showing a functional configuration of a PND of the related art.
Figure 30:
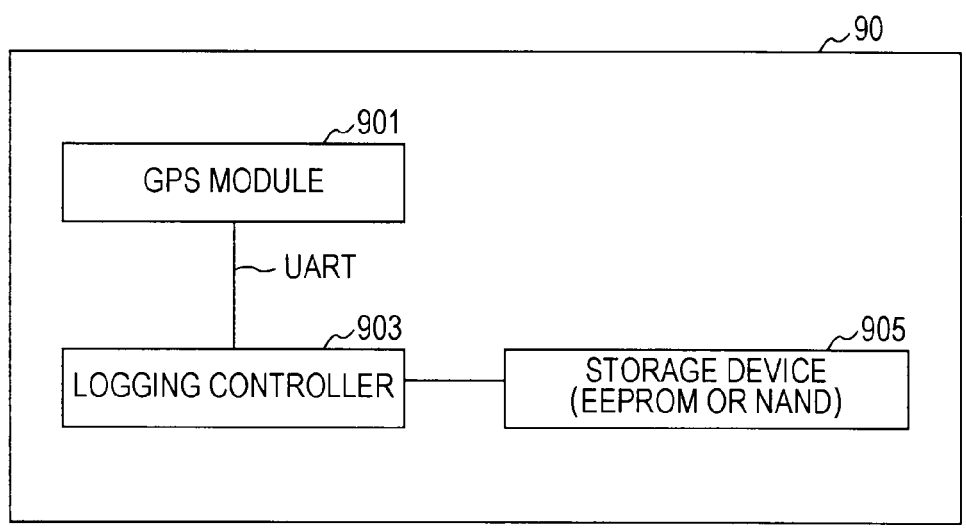
FIG. 30 is a block diagram showing a functional configuration of a dedicated logging terminal of the related art.

First, the configuration of a PND 10a according to a first embodiment of the disclosure will be described referring to FIGS. 1 to 3, and FIGS. 29 and 30. FIG. 1 is an appearance diagram of the PND according to first and second embodiments of the present disclosure. FIG. 2 is a functional block diagram of the PND according to the first embodiment of the disclosure. FIG. 3 is a block diagram showing the functional block diagram of FIG. 2 in further detail. FIG. 29 is a block diagram showing a functional configuration of a PND of the related art. FIG. 30 is a block diagram showing a functional configuration of a dedicated logging terminal of the related art.

Furthermore, in the present specification and drawings, when it is not necessary to particularly distinguish the PND according to the first and second embodiments of the disclosure, and when an element common in the first and second embodiments, it is referred to as a PND 10. In addition, when description is provided for either the first embodiment or the second embodiment, description is separately provided as the PND 10*a* and PND 10*b* according to necessity.

Referring to FIG. 1, the appearance example of the PND 10, which is an example of an information processing device according to an embodiment of the disclosure is shown. The PND 10 has a navigation function for guiding along a route to the destination and a logging function for recording positional information, and can provide various information that corresponds to the positional information to a user. The PND 10 includes on the front face a display unit 12 which displays an image including an information providing screen for providing various information, and the housing thereof is held by a cradle 14 installed on the dashboard of a vehicle through a suction cup 16. The PND 10 can be easily placed on and removed from the cradle 14.

In addition, the PND 10 includes a switch 11 which can turn on and off the power of the PND 10 by being pressed down, and a light emitting unit 13 which emits light of various colors and light in patterns. The light emitting unit 13 is lit with green when, for example, the PND 10 is operated in a normal operation mode. In addition, the light emitting unit 13 is switched on and off in accordance with the recording frequency of movement trace information when the PND 10 is operated in a dedicated logging mode.

Next, referring to FIG. 2, the functional configuration of the PND 10*a* according to the first embodiment of the disclosure is shown. The PND 10*a* mainly includes a GPS module 101, a logging controller 103, a logging storage device 105, and a main system 109. In order to describe the configuration of the PND 10*a*, functional configurations of a PND 80 and a dedicated logging terminal 90 of the related art will be described with reference to FIGS. 29 and 30.

The PND 80 of the related art shown in FIG. 29 mainly includes a GPS module 801 and a main system 809. Movement trace information obtained after making positional information correspond to times when the positional information is acquired and accumulating the data has been becoming important information in recent years to understand action ranges and action patterns of users. As frequently as positional information is recorded, such action ranges and action patterns of users can be understood in detail. At the same time, however, the amount of power consumption escalates as much as the frequency of recording the positional information. The PND 80 can be removed from a vehicle and operated by the drive of batteries. In order to understand an action range and action pattern of a user, for example, it is desirable to acquire positional information of the user moving on foot, by bicycle, or the like during the drive of batteries. In the PND 80 of the related art, however, it is necessary for the main system to be driven in order to record positional information. For this reason, it has been difficult to record positional information for a long period of time when the PND 80 is driven by batteries.

In addition, the dedicated logging terminal 90 of the related art shown in FIG. 30 is a terminal device dedicated to logging. The dedicated logging terminal 90 includes, for example, a GPS module 901, a logging controller 903, and a storage device 905. Herein, "logging dedicated" is a term used in order to distinguish a device such as a navigation device, a mobile telephone, or the like which has a logging function as an additional function. In other words, "logging dedicated" means the logging function is the main function. In this case, it was necessary for a user to carry the dedicated logging terminal 90 only for the use of the logging function. In short, when a user wanted to use the function of a mobile telephone or a navigation device, it was necessary to carry the dedicated logging terminal 90 in addition to a mobile telephone or a navigation device.

On the other hand, the PND 10 according to the embodiment includes a logging controller 103 between the GPS module 101 acquiring positional information and the main system 109, which uses the logging storage device 105 that is an independent storage area. For this reason, the PND 10 can record movement trace information by controlling the logging controller 103 and the GPS module 101 even when the main system 109 is in a sleep mode. Since the main system 109 handles many functions such as the control of the display unit 12, navigation, and the like, the main system consumes a large amount of power for operations. On the other hand, the logging controller 103 has a function specified in recording movement trace information. For this reason, the amount of power consumption is small when the logging controller 103 controls the GPS module 101 to record positional information, in comparison to a case where the main system 109 directly controls the GPS module 101 to record positional information. By being operated in the dedicated logging mode in which the main system 109 records positional information in the sleep mode, the PND 10 can reduce power consumption necessary for recording movement trace information and can record positional information for a long period of time.

Herein, an example of the configuration of the PND 10*a* will be described in detail referring to FIG. 3. The PND 10*a* mainly includes the GPS module 101, the logging controller 103, the logging storage device 105, and the main system 109.

The GPS module 101 has the function of a GPS receiver that is an example of a position acquiring unit acquiring positional information that indicates the current position. Specifically, the GPS module 101 mainly includes a GPS antenna 112 and a GPS processing unit 132.

The GPS antenna 112 is an antenna receiving GPS signals from a plurality of GPS satellites. The GPS antenna 112 inputs the received GPS signals to the GPS processing unit 132. Furthermore, the received GPS signals include information such as orbit data indicating the orbit of GPS satellites from which the GPS signals are transmitted, the transmission time of the GPS signals, and the like.

In addition, the GPS processing unit 132 calculates positional information indicating the current position of the PND 10*a* based on a plurality of GPS signals input from the GPS antenna 112. Specifically, the GPS processing unit 132 calculates the position of each GPS satellite based on orbit data obtained by demodulating each of the plurality of GPS signals. In addition, the GPS processing unit 132 calculates the distance from each GPS satellite to the PND 10*a* based on the difference between the transmission time and reception time of the GPS signals. In addition, the GPS processing unit 132 calculates the current three-dimensional position of the PND 10*a* based on the calculated position of each GPS satellite and the distance from the GPS satellite to the PND 10*a*.

Furthermore, the GPS module 101 can transmit positional information to the logging controller 103 by acquiring the positional information with a set frequency. Furthermore, the GPS module 101 and the logging controller 103 are connected to each other by, for example, a UART (Universal Asynchronous Receiver Transmitter), I2C (Inter-Integrated Circuit), a USB (Universal Serial Bus), an SPI (Serial Peripheral Interface), Bluetooth (registered trademark), or the like. Hereinafter, an example in which the UART is used will be described.

The logging controller 103 is arranged between the GPS module 101 and the main system 109, and has a function of controlling recording of movement trace information of the PND 10a in the dedicated logging mode. When the PND 10a is operated in the dedicated logging mode, the logging controller 103 acquires positional information in a predetermined cycle by controlling the GPS module 101. In addition, the logging controller 103 stores the acquired positional information in the logging storage device 105 by making the time when the positional information is acquired correspond thereto. Furthermore, in the description below, information obtained by making the time when the positional information is acquired correspond thereto is referred to as movement trace information. In addition, when the PND 10a is operated in the normal mode, the logging controller 103 performs in a transmissive manner. In other words, when the logging controller 103 receives a positional information acquisition request from the main system 109, the logging controller inputs the received positional information acquisition request to the GPS module 101 without change. In addition, when the logging controller 103 receives positional information from the GPS module 101, the logging controller inputs the received positional information to the main system 109 without change.

The logging storage device 105 is an example of a first storage device which is operated by being controlled by the logging controller 103. The logging storage device 105 has an independent storage area from the main system 109. The logging storage device 105 can include, for example, a storage medium, a recording device which records data on a storage medium, a reading device which reads data from a storage medium, a deleting device which deletes data recorded on a storage medium, or the like. Herein, a storage medium may be a storage medium, for example, a non-volatile memory including a flash ROM (or a flash memory), an EEPROM (Electrically Erasable Programmable Read-Only Memory), or the like, a magnetic disk including a hard disk, and a disc-type magnetic material disk or the like, an optical disc including, a CD (Compact Disc), a DVD-R (Digital Versatile Disc Recordable), a BD (Blu-Ray Disc (registered trademark)), or the like, an MO (Magneto Optical) disc, or the like.

The main system 109 is an example of a main function unit for operating main functions of the PND 10a. The main system 109 mainly includes a display unit 12, a storage unit 102, an operation unit 104, a voice output unit 106, and a navigation unit 150. Furthermore, the main system 109 and the logging controller 103 are connected to each other by, for example, a UART (Universal Asynchronous Receiver Transmitter), I2C (Inter-Integrated Circuit), a USE (Universal Serial Bus), an SPI (Serial Peripheral Interface), Bluetooth (registered trademark), or the like. Hereinafter, an example in which the UART is used will be described.

The display unit 12 is a display device provided in the front surface of the PND 10a. The display unit 12 outputs a screen in which map data is superimposed with information indicating the current position. The display unit 12 may be a display device, for example, a liquid crystal display (LCD), an organic electroluminescence (EL) display, or the like.

The storage unit 102 is an example of a second storage device which stores a program for operating the PND 10a, map data, and the like. The storage unit 102 can include, for example, a storage medium, a recording device which records data on a storage medium, a reading device which reads data from a storage medium, a deleting device which deletes data recorded on a storage medium, or the like. Herein, a storage medium may be a storage medium, for example, a non-volatile memory including a flash ROM (or a flash memory), an EEPROM (Electrically Erasable Programmable Read-Only Memory), or the like, a magnetic disk including a hard disk, and a disc-type magnetic material disk or the like, an optical disc including, a CD (Compact Disc), a DVD-R (Digital Versatile Disc Recordable), a BD (Blu-Ray Disc (registered trademark)), or the like, an MO (Magneto Optical) disc, or the like.

The storage unit 102 can store the movement trace information. The movement trace information is obtained such that a logging control function of the navigation unit 150 makes positional information acquired from the GPS module 101 correspond to the acquisition time when the PND 10a is operated in the normal mode. In addition, the movement trace information stored in the storage unit 102 may be movement trace information stored in the logging storage unit 105 acquired by the logging control function of the navigation unit 150 in the dedicated logging mode.

The operation unit 104 receives an operation instruction from a user and outputs the content of the operation to the navigation unit 150. As such an operation instruction from a user, for example, there is setting of a destination, magnification and reduction of a map, setting of voice guidance, setting of screen display, and the like. The operation unit 104 may be a touch screen integrally provided with the display unit 12. Alternatively, the operation unit 104 may be a physical structure including a button, a switch, a lever, or the like, separately provided from the display unit 12. In addition, the operation unit 104 may be a signal reception unit which detects signals indicating an operation instruction from a user, which are transmitted from a remote controller.

The voice output unit 106 is an output device which outputs voice data, for example, a speaker, or the like. The voice output unit 106 outputs, for example, voice guidance pertaining to navigation. The user can come to know the route to progress while listening to the voice guidance without watching the display unit 12.

The navigation unit 150 has a function of controlling the entire function of the main system 109. The navigation unit 150 mainly has functions of, for example, a display control unit for controlling the display screen of the display unit 12, a navigation processing unit for guiding along the route to the destination set based on operation information by the operation unit 104, and a logging control unit for controlling recording of movement trace information of the PND 10a in the normal mode.

The main system 109 has a normal state in which the device is operated with standard power consumption (normal operation mode), and a sleep state in which the device is operated with power consumption less than the normal state (power saving mode). For example, the sleep state is a state where the power supply to the hardware is cut with the content of the memory maintained. When PND 10a is activated from the shut-down state, the program necessary for operating the PND 10a has to be read again, it takes quite some time to return to a usage state. On the other hand, in the sleep state, it is not necessary to read the program again to return to the normal state, different from the shut-down state, it takes a shorter period of time to return to the usage state. In addition, the main system 109 can be switched from the sleep state to the normal state according to the control of the logging controller 103.

Hereinabove, an example of the function of the PND 10a according to the embodiment is shown. Each constituent element described above may be configured using a general-purpose member or circuit, or by hardware specified to the function of each constituent element. In addition, the function of each constituent element may be performed such that a control program is read from a storage medium such as a ROM (Read Only Memory), a RAM (Random Access Memory), or the like storing a control program which describes the procedure of a process for realizing the function by an arithmetic device including a CPU (Central Processing Unit), or the like, and interpreted for execution. Therefore, the configuration to be used can be appropriately modified depending on the level of technique of each time when the embodiment is implemented.

Furthermore, a computer program for realizing each of the functions of the PND 10a according to the above-described embodiment can be created, and loaded on a personal computer, or the like. In addition, it is possible to provide a recording medium which stores such a computer program and is readable in a computer. Such a recording medium includes, for example, a magnetic disk, an optical disc, a magneto-optical disc, a flash memory, or the like. In addition, the above-described computer program may be sent through, for example, a network, without using a recording medium.

[1-2. Operation Mode]

Figure 4:
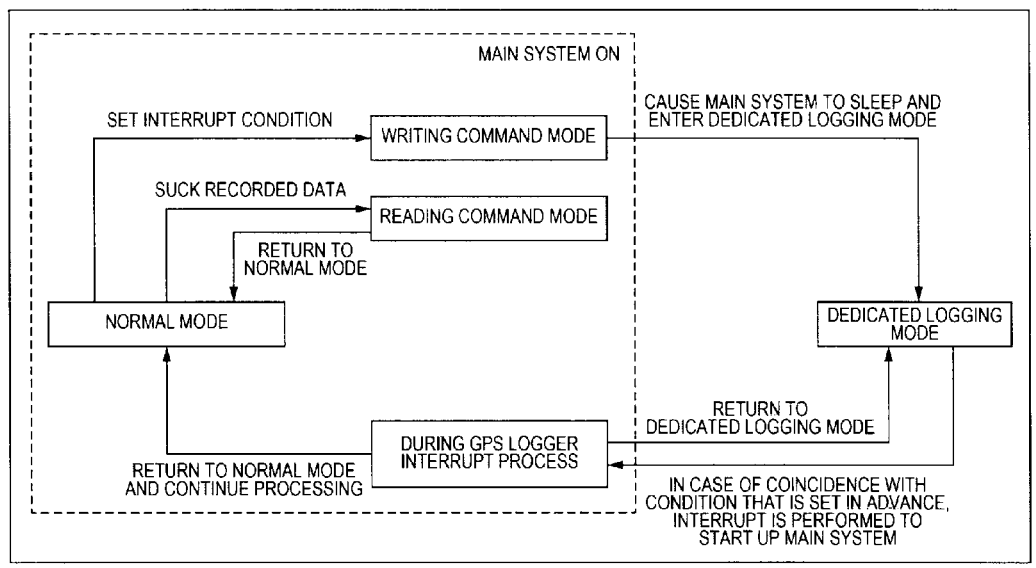
FIG. 4 is a state transition diagram of the PND according to the first embodiment.
Figure 5:
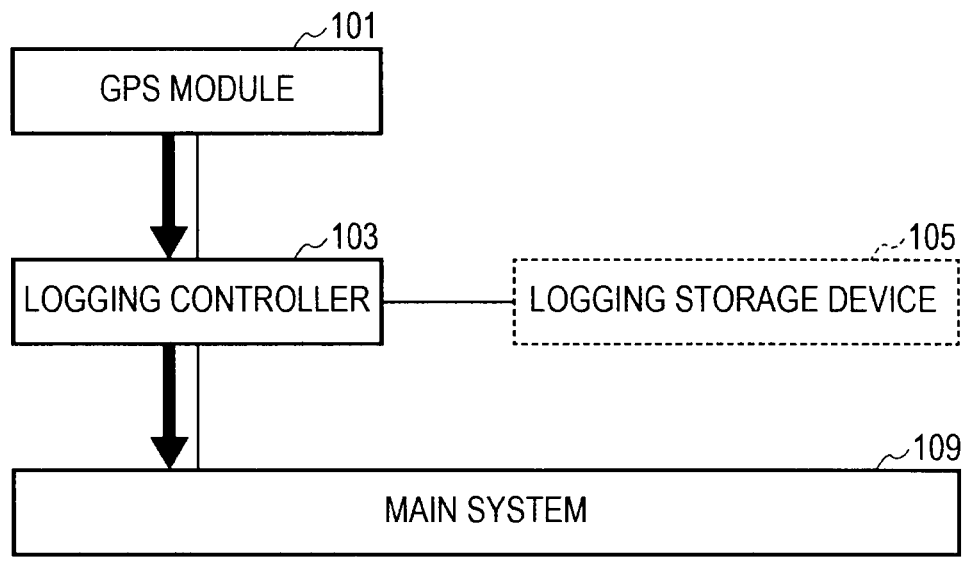
FIG. 5 is an illustrative diagram of a normal mode of the PND according to the first embodiment.
Figure 6:
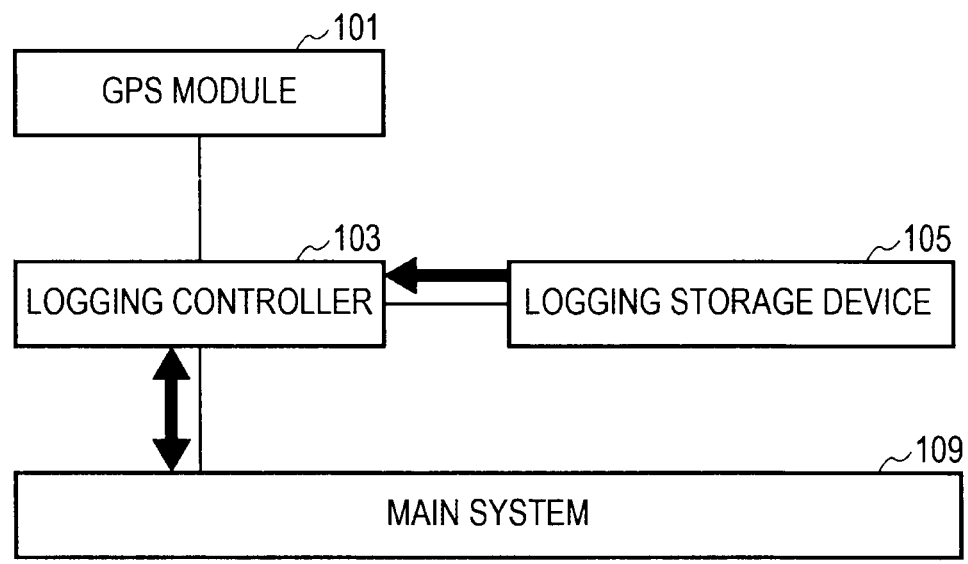
FIG. 6 is an illustrative diagram of a command mode of the PND according to the first embodiment.
Figure 7:
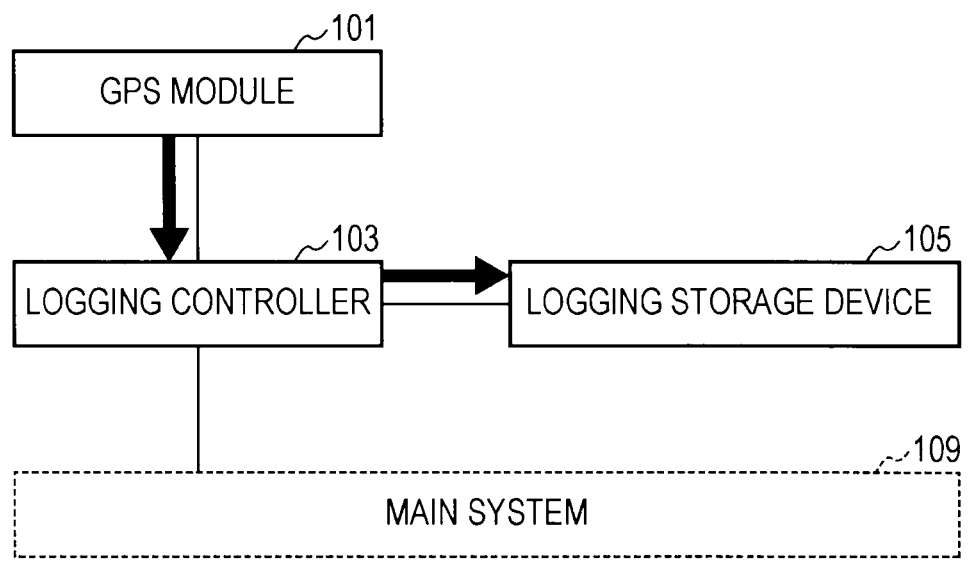
FIG. 7 is an illustrative diagram of a dedicated logging mode of the PND according to the first embodiment.

Next, the operation mode of the PND 10a will be described referring to FIGS. 4 to 7. FIG. 4 is a state transition diagram of the PND according to the first embodiment. FIG. 5 is an illustrative diagram of a normal mode of the PND according to the first embodiment. FIG. 6 is an illustrative diagram of a command mode of the PND according to the first embodiment. FIG. 7 is an illustrative diagram of a dedicated logging mode of the PND according to the first embodiment.

Description is provided above that the main system 109 of the PND 10a has the normal state and the sleep state, but the PND 10a has an operation modes described next. States of transition between each mode are shown in FIG. 4.

The PND 10a mainly has the normal mode, the dedicated logging mode, and the command mode. The command mode further has a reading command mode which is used for reading the movement trace information stored in the logging storage device 105 and a writing command mode which is used for the main system 109 to instruct to the logging controller 103. In addition, when the mode is transited from the dedicated logging mode to the normal mode, the PND 10a can be operated by the status during processing a GPS logger interrupt.

Among the above-described modes, the dedicated logging mode is an operation mode in which the main system 109 is in the sleep state. The main system 109 is in the normal state in the normal mode, the command mode, and in the middle of the GPS logger interference process.

The PND 10a checks whether or not there is a sufficient empty capacity in, for example, the logging storage device 105 before the mode is transited from the normal mode to the dedicated logging mode. Then, when the empty capacity is insufficient, the mode of the PND 10a is transited from the normal mode to the reading command mode, and absorbs the movement trace information stored in the logging storage device 105. In other words, the main system 109 reads the movement trace information stored in the logging storage device 105 and causes the storage unit 102 in the main system 109 to store the information. When the transfer of the data is completed, the PND 10a is transited to the normal mode.

Then, the main system 109 sets interrupt conditions in the logging controller 103 before the mode of the main system 109 is switched to the sleep state. At this time, the mode of the PND 10a is transited from the normal mode to the writing command mode. When the PND 10a sets a condition for making the main system 109 return, or the like in the logging controller 103 in the state of the writing command mode, the main system 109 is switched to the sleep state. Then, the mode of the PND 10a is transited from the writing command mode to the dedicated logging mode.

Furthermore, when the state of the PND 10a coincides with the conditions set beforehand, the logging controller 103 switches the main system 109 to the normal state, and performs an interference process. In the status of the ongoing GPS logger interference process, it is determined whether the PND 10a really returns to the normal mode from the dedicated logging mode, or to the dedicated logging mode.

As described above, the operation mode of the PND 10a is transited. Herein, the characteristics of each operation mode will be described again.

(Normal Mode)

The normal mode is a standard operation mode of the PND 10a. When the PND 10a is operated in the normal mode, the main system 109 is in a normal state. Referring to FIG. 5, power is supplied to the GPS module 101, the logging controller 103, and the main system 109 of the PND 10a in the normal mode. On the other hand, since the logging storage device 105 is not used in the normal mode, power may not be supplied to the logging storage device 105. When the PND 10a is operated in the normal mode, the logging controller 103 performs in a transmissive manner. In other words, in order to generate movement trace information when the PND 10a is operated in the normal mode, positional information acquired by the GPS module 101 is input to the main system 109 through the logging controller 103.

(Command Mode)

The command mode is an operation mode in which the main system 109 of the PND 10a inputs an instruction command to the logging controller. Referring to FIG. 6, power is supplied to all of the GPS module 101, the logging controller 103, the logging storage device 105, and the main system 109 in the PND 10a in the command mode. The command mode includes a reading command mode and writing command mode. The reading command mode is an operation mode for reading data stored in the logging storage device 105. The main system 109 inputs a command for giving a reading instruction of the movement trace information to the logging controller 103 to acquire the movement trace information stored in the logging storage device 105. In addition, the writing command mode is an operation mode in which the main system 109 sets various conditions in the logging controller 103. In the writing command mode, for example, after the main system 109 is transited to the dedicated logging mode, the main system 109 can set a condition that the main system 109 returns to the normal state in the logging controller 103.

(Dedicated Logging Mode)

The dedicated logging mode is an operation mode used by selection of a user when the PND 10a generates movement trace information for a long period of time. In the dedicated logging mode, the PND 10a is not able to use, for example, a navigation function. Instead, the PND 10a can record the movement trace information of a long period of time suppressing power consumption by being operated in the dedicated logging mode. Referring to FIG. 7, when the PND 10a is operated in the dedicated logging mode, power is supplied to the GPS module 101, the logging controller 103, and the logging storage device 105. On the other hand, when the PND 10*a* is operated in the dedicated logging mode, the main system 109 is in the sleep state.

[1-3. First Operation Example]

Figure 8:
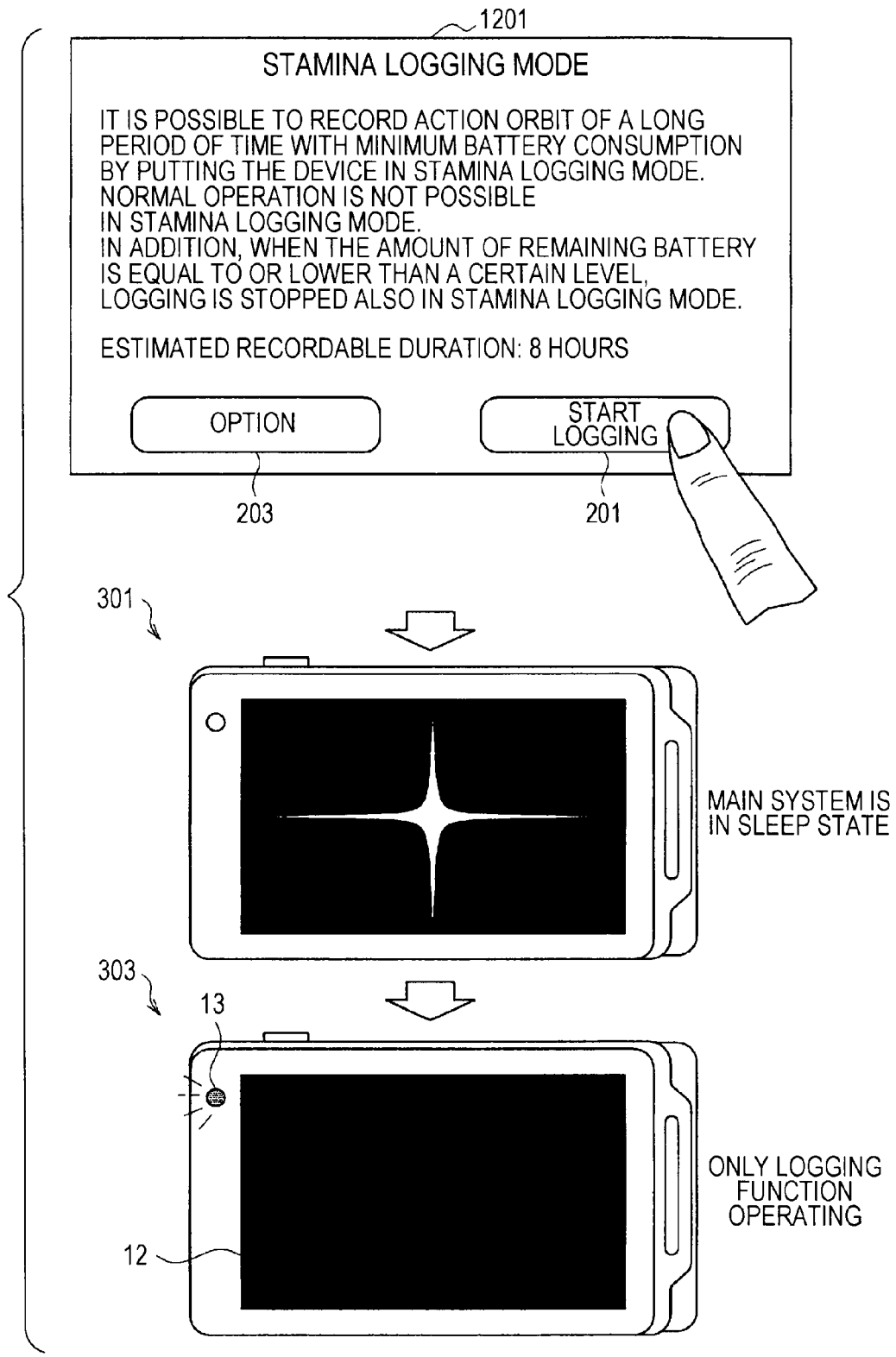
FIG. 8 is an illustrative diagram of an operation of the PND when logging starts in the dedicated logging mode of the PND according to the first embodiment.
Figure 9:
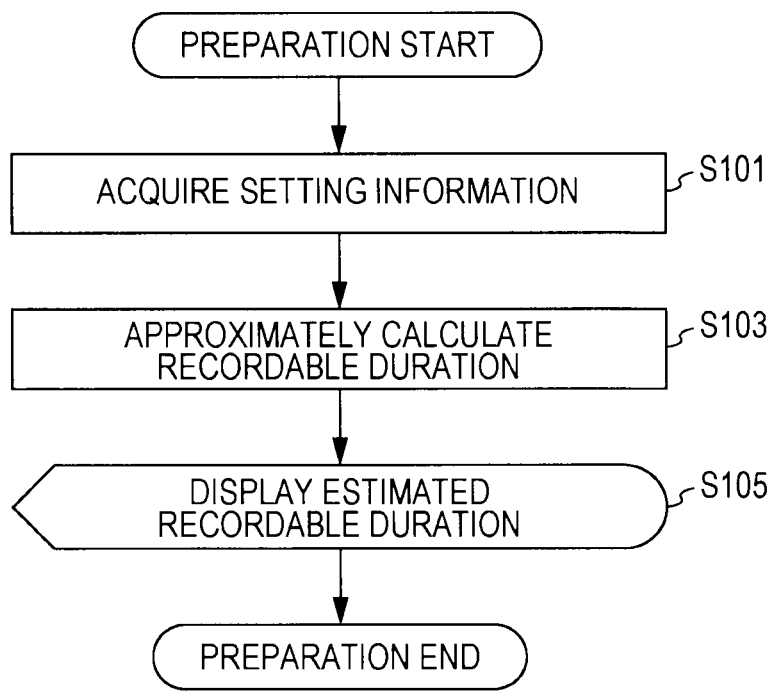
FIG. 9 is a flowchart showing a logging start preparation operation of a main system of the PND according to the first embodiment.
Figure 10:
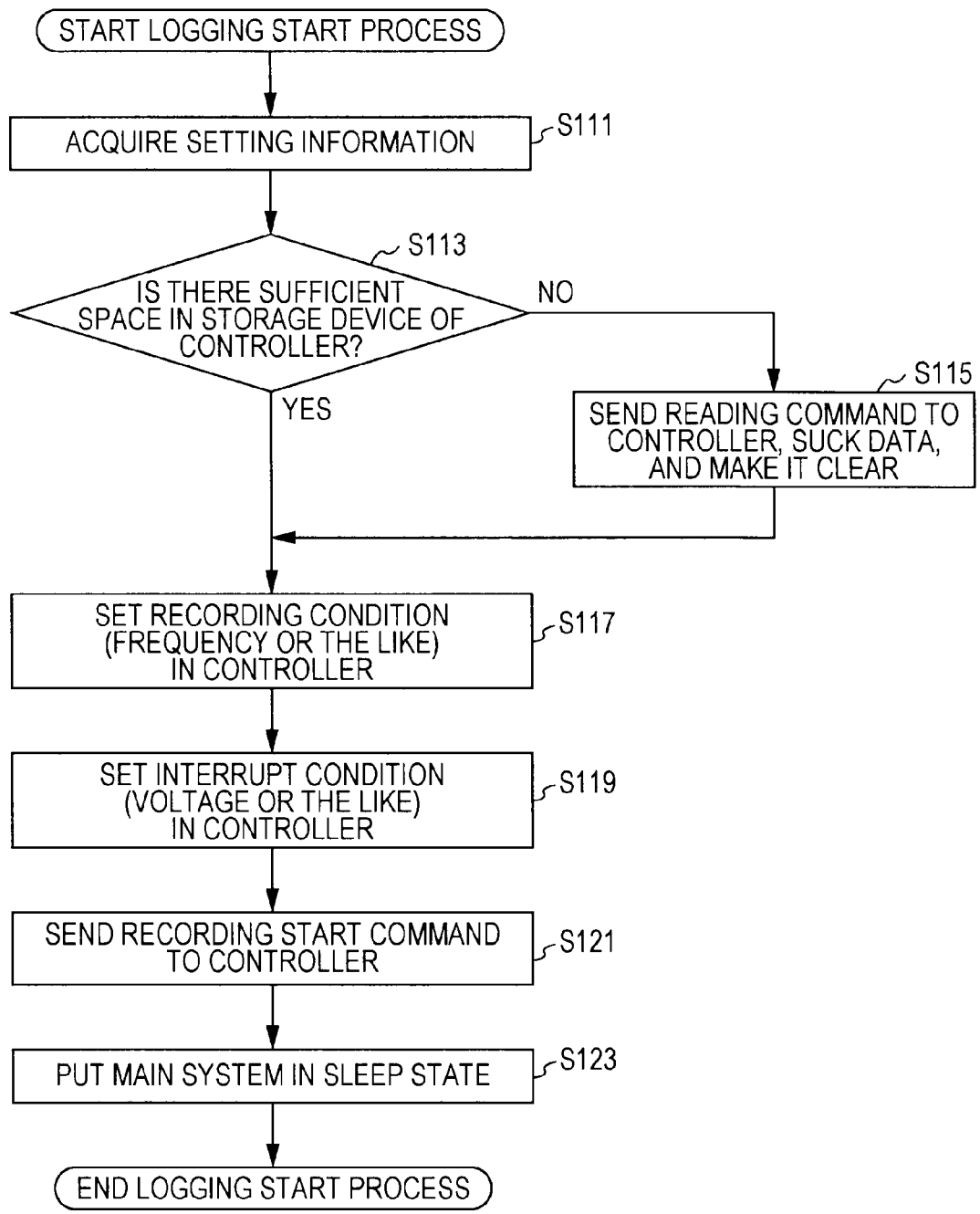
FIG. 10 is a flowchart showing an operation of a logging start process of the main system of the PND according to the first embodiment.
Figure 11:
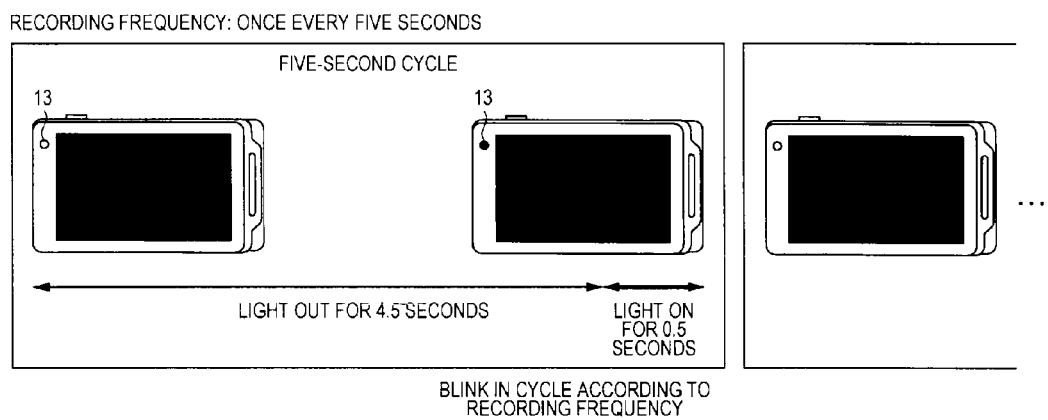
FIG. 11 is an illustrative diagram on the blinking on and off of a lighting emitting unit during logging of the PND according to the first embodiment.
Figure 12:
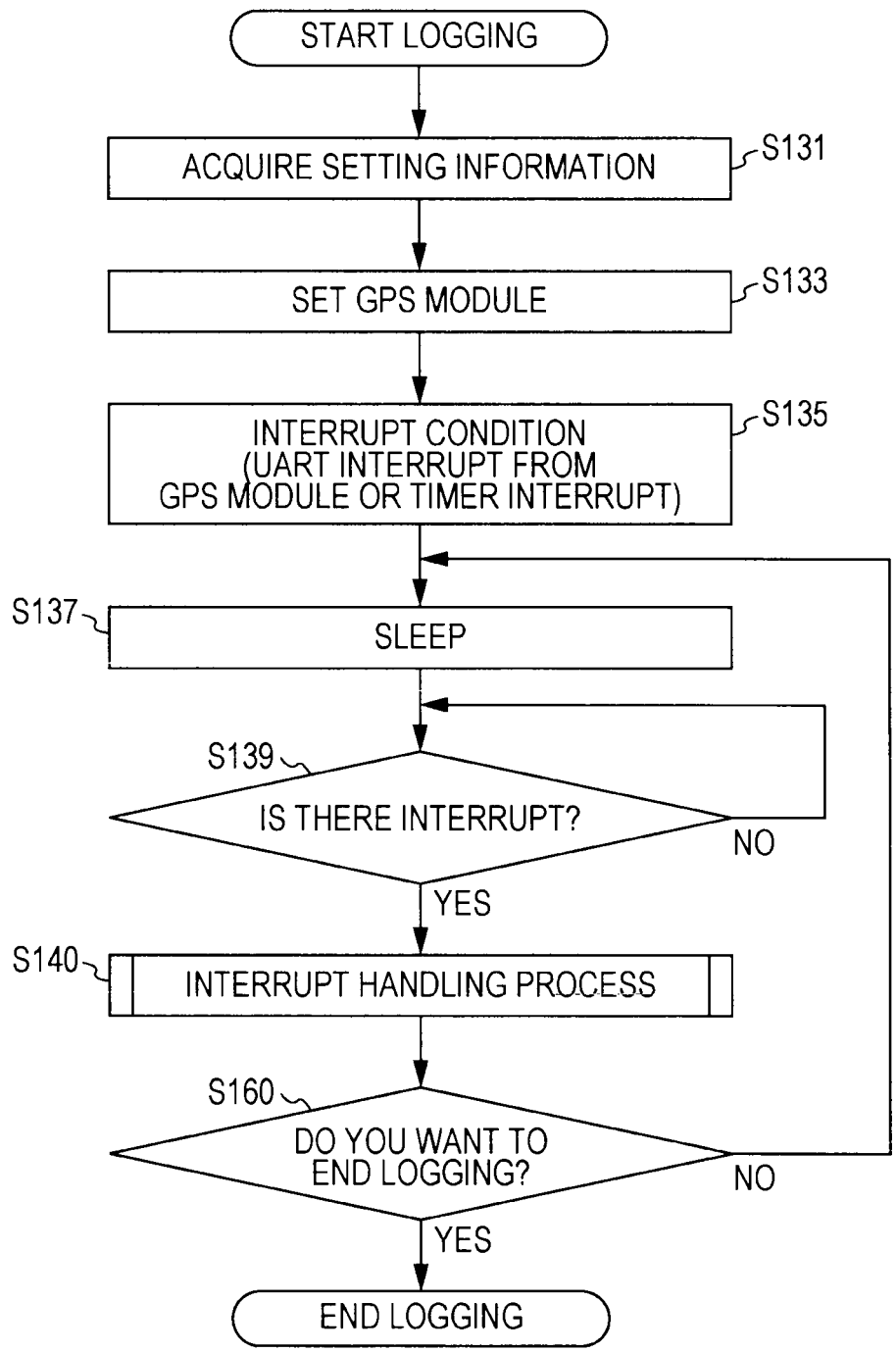
FIG. 12 is a flowchart showing an operation of a logging process of a logging controller of the PND according to the first embodiment.
Figure 13:
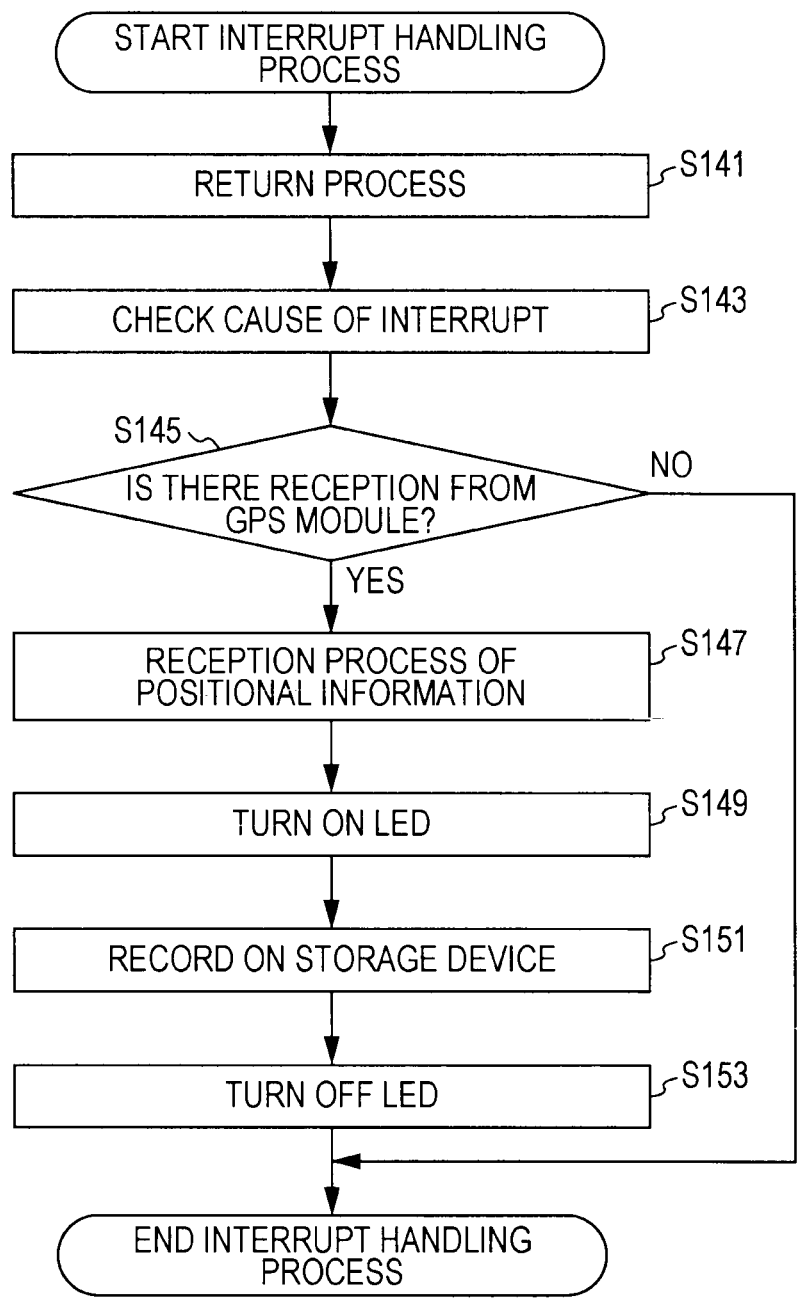
FIG. 13 is a flowchart showing an operation of an interrupt handling process of the logging controller of the PND according to the first embodiment.
Figure 14:
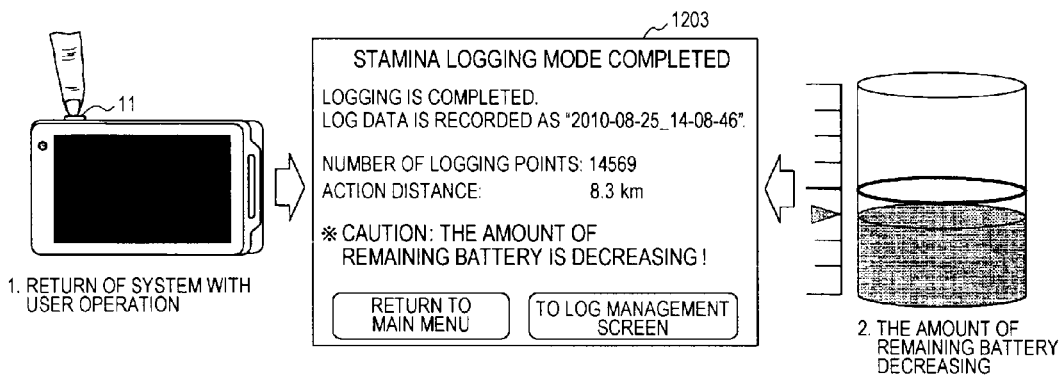
FIG. 14 is an illustrative diagram of a logging end process of the PND according to the first embodiment.
Figure 15:
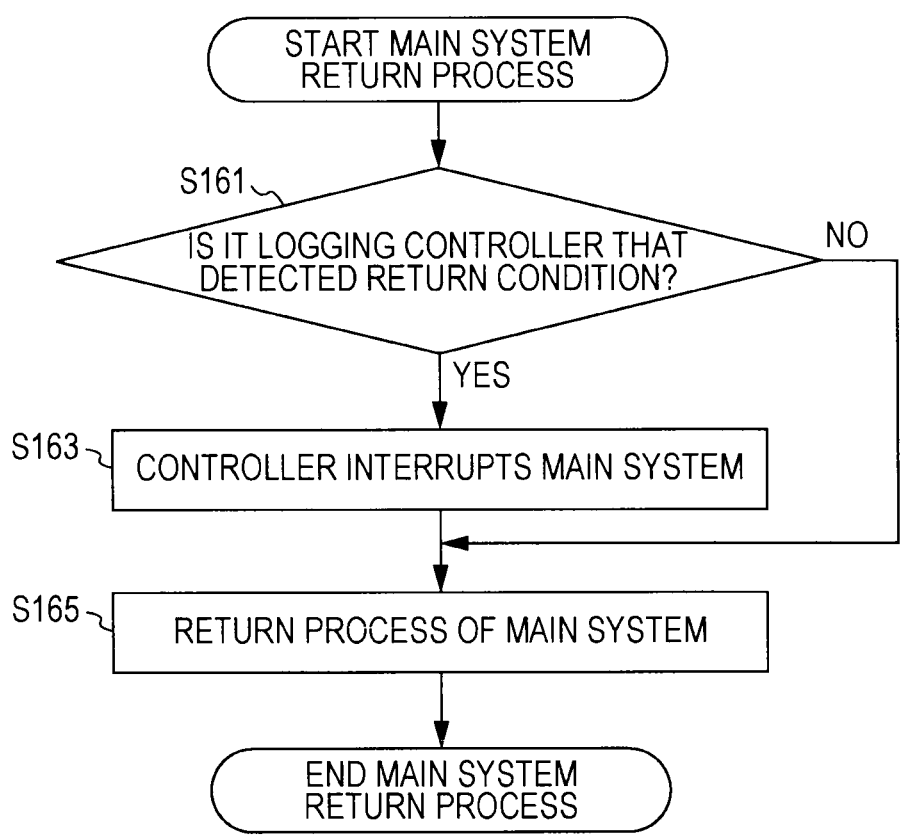
FIG. 15 is a flowchart showing an operation of a main system return process of the PND according to the first embodiment.
Figure 16:
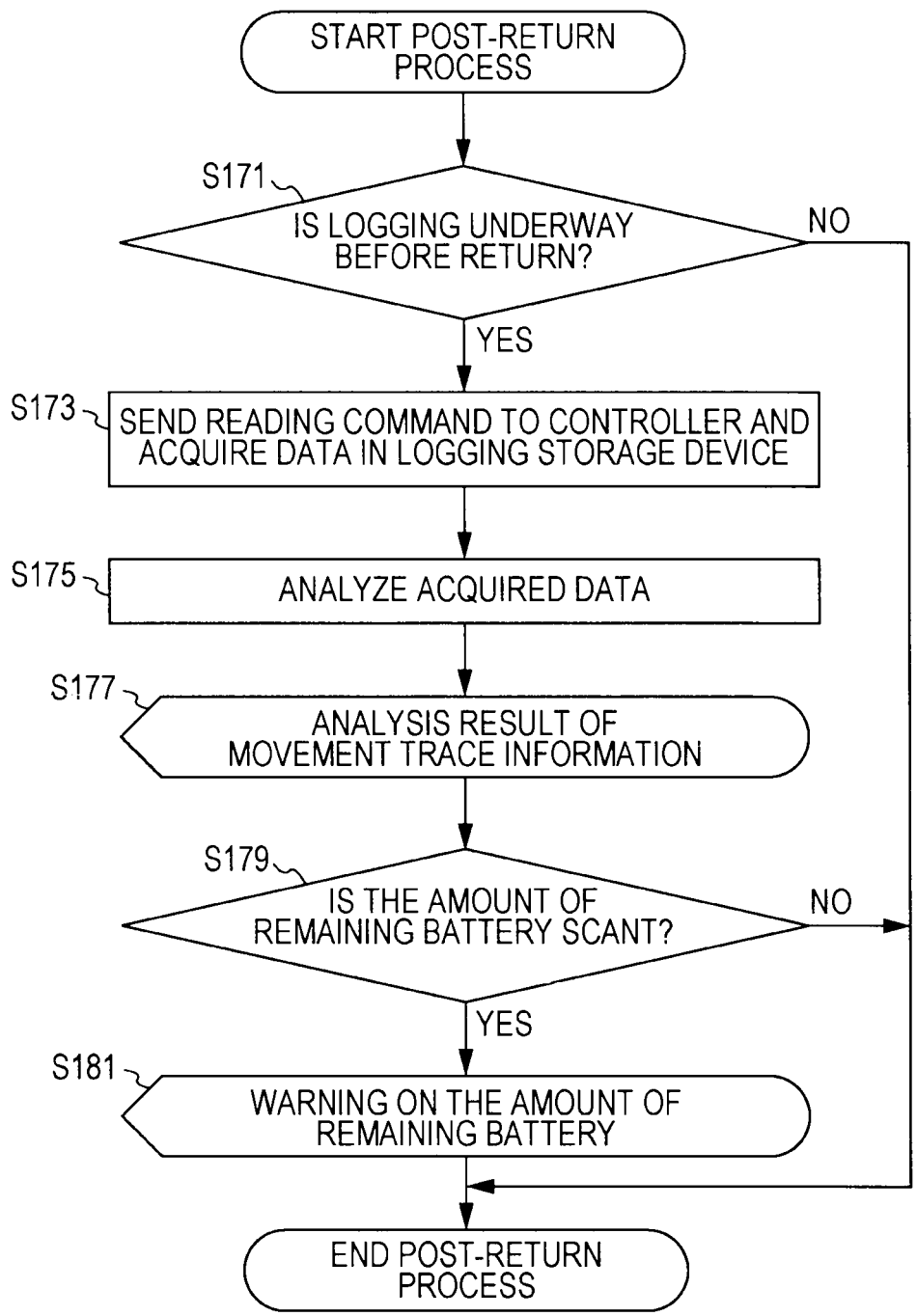
FIG. 16 is a flowchart showing an operation of a post-return process of the main system of the PND according to the first embodiment.

Next, a first operation example of the PND 10*a* will be described referring to FIGS. 8 to 16. FIG. 8 is an illustrative diagram of an operation of the PND when logging starts in the dedicated logging mode of the PND according to the embodiment. FIG. 9 is a flowchart showing a logging start preparation operation of the main system of the PND according to the embodiment. FIG. 10 is a flowchart showing an operation of a logging start process of the main system of the PND according to the embodiment. FIG. 11 is an illustrative diagram on the blinking on and off of a lighting emitting unit during logging of the PND according to the embodiment. FIG. 12 is a flowchart showing an operation of a logging process of the logging controller of the PND according to the embodiment. FIG. 13 is a flowchart showing an operation of an interrupt handling process of the logging controller of the PND according to the embodiment. FIG. 14 is an illustrative diagram of a logging end process of the PND according to the embodiment. FIG. 15 is a flowchart showing an operation of a main system return process of the PND according to the embodiment. FIG. 16 is a flowchart showing an operation of a post-return process of the main system of the PND according to the embodiment.

(Logging Start)

First, the operation of the PND 10*a* when the logging starts will be described. Referring to FIG. 8, first, a logging start screen 1201 when recording of movement trace information starts in the dedicated logging mode is shown. The logging start screen 1201 shows explanatory sentences on the dedicated logging mode and the estimated time of the recordable duration. In addition, the logging start screen 1201 includes a logging start button 201 and an option setting button 203. Furthermore, the title of "stamina logging mode" in the logging start screen 1201 has the same meaning as that of the dedicated logging mode.

If a user selects the logging start button 201 in the logging start screen 1201, the main system of the PND 10*a* is switched to the sleep state as shown by a sign 301. At this time, power supply to the display screen of the PND 10*a* is halted. After that, while the PND 10*a* is operated in the dedicated logging mode, the display unit 12 is in the state of displaying black as shown by a sign 303. In addition, the light emitting unit 13 blinks on and off.

Referring to FIG. 9 herein, a logging start preparation process of the PND 10*a* is shown. First, the main system 109 acquires setting information (S101). Then, the main system 109 approximately calculates a recordable duration (S103). The display control unit of the main system 109 causes the display unit 12 to display the logging start screen 1201 which includes the estimation of the recordable duration that has been approximately calculated.

Next, referring to FIG. 10, the main system 109 acquires the setting information (S111), and determines whether or not there is sufficient space in the logging storage device 105 of the logging controller 103 (S113). The determination of Step S113 may be based on, for example, whether or not the space capacity of the logging storage device 105 is equal to or lower than a predetermined threshold value. Alternatively, the determination of Step S113 may be performed by comparing necessary capacity for recording the movement trace information for the recordable duration approximately calculated based on the amount of remaining battery to the space capacity of the logging storage device 105. When the space capacity is determined to be not sufficient in the determination of Step S113, the main system 109 sends a reading command to the logging controller 103. Then, after the logging storage device 105 sends the stored movement trace information to the main system 109 according to the reading command, the logging storage device erases the movement trace information (S115). With this configuration, the PND 10*a* can avoid a stop of recording of the movement trace information caused by insufficient storage capacity.

On the other hand, when it is determined that the logging storage device 105 has sufficient space capacity in the determination of Step S113, the process of Step S115 is omitted. Then, the main system 109 sets a recording condition in the logging controller 103 (S117). The recording condition set at this moment is, for example, a recording frequency of the movement trace information, or the like. Then, the main system 109 sets an interrupt condition in the logging controller 103 (S119). The interrupt condition set at this moment is a condition serving as a trigger for, for example, stopping the logging process of the logging controller 103 and switching the main system 109 from the sleep state to the normal state. Specifically, the interrupt condition may be a voltage value. In this case, the logging controller 103 detects that the amount of remaining battery is equal to or lower than a predetermined threshold value by a voltage value and switches the main system 109 from the sleep state to the normal state.

Next, the main system 109 sends a recording start command to the logging controller 103 (S121). Then, the operation mode of the main system 109 is switched from the normal state to the sleep state (S123). With the above process, the logging process starts.

(Ongoing Logging)

Next, an example of a method for effectively showing ongoing logging will be described. Referring to FIG. 11, the state of ongoing logging process of the PND 10*a* is shown. When the PND 10*a* is operated in the dedicated logging mode, power supply to the display unit is in a halted state. In addition, the light emitting unit 13 blinks on and off in a cycle according to the recording frequency of the movement trace information. When the recording frequency of the movement trace information is, for example, once every five seconds, light of the light emitting unit 13 is in an off state for 4.5 seconds. Then, light the light emitting unit 13 is on for 0.5 seconds after that. With the configuration, the user can intuitively recognize the recording frequency by seeing the lighting cycle of the light emitting unit 13.

Referring to FIG. 12, first, the logging controller 103 acquires setting information (S131). The setting information acquired here is setting information, for example, the recording frequency, or the like, set by the main system 109. Next, the logging controller 103 executes setting of the GPS module 101 (S133). The logging controller 103 sets, for example, a recording frequency of the movement trace information for the GPS module 101 (in other words, an acquisition frequency of positional information of the GPS module 101). Then, the GPS module 101 can acquire positional information with the set frequency and input the information to the logging controller 103.

Next, the logging controller 103 executes setting of an interrupt condition (S135). The interrupt condition mentioned here is a condition for switching the logging controller 103 from the sleep state to the normal state. The interrupt condition may be, for example, reception of UART interrupt from the GPS module 101 or passage of a timer-set time.

When the logging controller 103 sets the interrupt condition, the logging controller 103 is switched to the sleep state (S137). Then, it is determined whether or not there is an interrupt (S139). When an interrupt occurs, the logging controller 103 then executes an interrupt handling process (S140). Details of the interrupt handling process will be described later using FIG. 13. When the interrupt handling process ends, the logging controller 103 determines whether or not logging is to end (S160). When logging does not end, the process returns to Step S137 again.

Next, details of the interrupt handling process will be described referring to FIG. 13. When the interrupt handling process starts after an interrupt is received, first, the logging controller 103 executes a returning process (S141). In other words, the logging controller 103 switches the state of the logging controller 103 from the sleep state to the normal state. Then, the logging controller 103 checks the cause of the interrupt (S143). Herein, the logging controller 103 determines whether or not the cause of interrupt is reception of positional information from the GPS module 101 (S145). Then, when the cause of the interrupt is reception of positional information from the GPS module 101, the logging controller 103 executes a reception process of the next positional information (S147).

Then, when the LED (light emitting unit 13) is on, the logging controller 103 records movement trace information obtained by making the positional information in the logging storage device 105 correspond to the acquisition time of the positional information (S151). The logging controller 103 turns off the LED when recording of the movement trace information ends (S153).
(End of Logging)

Furthermore, the determination of whether or not logging is to end shown in Step S160 of FIG. 12 may be performed based on the reference shown in FIG. 14. Herein, two examples are raised as the trigger for the end of logging.

The first example is that logging ends by detecting that the user presses down the switch 11 of the PND 10a. In addition, the second example is that logging automatically ends by detection of a decrease in the amount of remaining battery by the logging controller 103.

When logging ends with detection of either option and then the main system 109 is switched from the sleep state to the normal state, a logging end screen 1203 may be displayed. In the logging end screen 1203, the main system 109 can display, for example, the file name of saved log data, statistic data during logging, and an alert message of a decrease in the amount of remaining battery as necessary.

Herein, the return process of the main system will be described with reference to FIG. 15. The process flow of FIG. 15 is executed triggered by detection of pressing down of the switch 11 by the user or detection of a decrease in the amount of remaining battery.

First, it is determined whether or not what detected the return condition is the logging controller 103 (S161). Then, when the logging controller 103 detects the return condition, the logging controller 103 interrupts the main system 109 (S163). Then, the return process of the main system 109 is executed (S165). In other words, the main system 109 switches the state of the main system 109 itself from the sleep state to the normal state.

With the configuration, after the main system 109 return to the normal state, the post-return process shown in FIG. 16 is executed in the main system 109. First, the main system 109 determines whether or not logging was ongoing before the return of the main system 109 (S171). Then, when the logging was ongoing before the return, the main system 109 sends a reading command to the logging controller 103, reads the movement trace information stored in the logging storage device 105, and causes the storage unit 102 in the main system 109 to store the information (S173).

The main system 109 may analyze the movement trace information acquired in Step S173 (S175). Next, the main system 109 displays the analysis result of the recorded movement trace information (S177). Then, the main system 109 determines whether or not the amount of remaining battery is in an alarming level (S179). When the amount of remaining battery decreases, the main system 109 causes a warning message on the amount of remaining battery to be displayed (S181).

Hereinabove, a series of the flow of the first operation example has been described. According to the first operation example of the PND 10a according to the embodiment, the movement trace information is generated as the main system 109 in the sleep state. For this reason, power consumption necessary for the generation of the movement trace information, that is, logging of positional information can be lowered. In addition, while the movement trace information is recorded, the light emitting unit 13 blinks on and off in the cycle according to the recording frequency. For this reason, the user can intuitively recognize the recording frequency by seeing the blinking cycle of the light emitting unit 13.

In addition, in the logging, the PND 10a can further put the logging controller 103 in the sleep state until UART interrupt from the GPS module 101 occurs. For this reason, a further decrease in power consumption can be intended. Furthermore, when the user presses down the switch 11, a case can be considered where the user wants to use a function other than logging. For this reason, when the user presses down the switch 11, in the PND 10a, logging ends and the main system 109 can be switched from the sleep state to the normal state. Furthermore, it is assumed that the logging process ends according to the pressing down of the switch 11 here, but the present disclosure is not limited to the example. For example, the logging process may not end even though the switch 11 is pressed down. In this case, when the main system 109 is switched from the sleep state to the normal state, the logging process may be executed by a background process.

[1-4. Second Operation Example]

Figure 17:
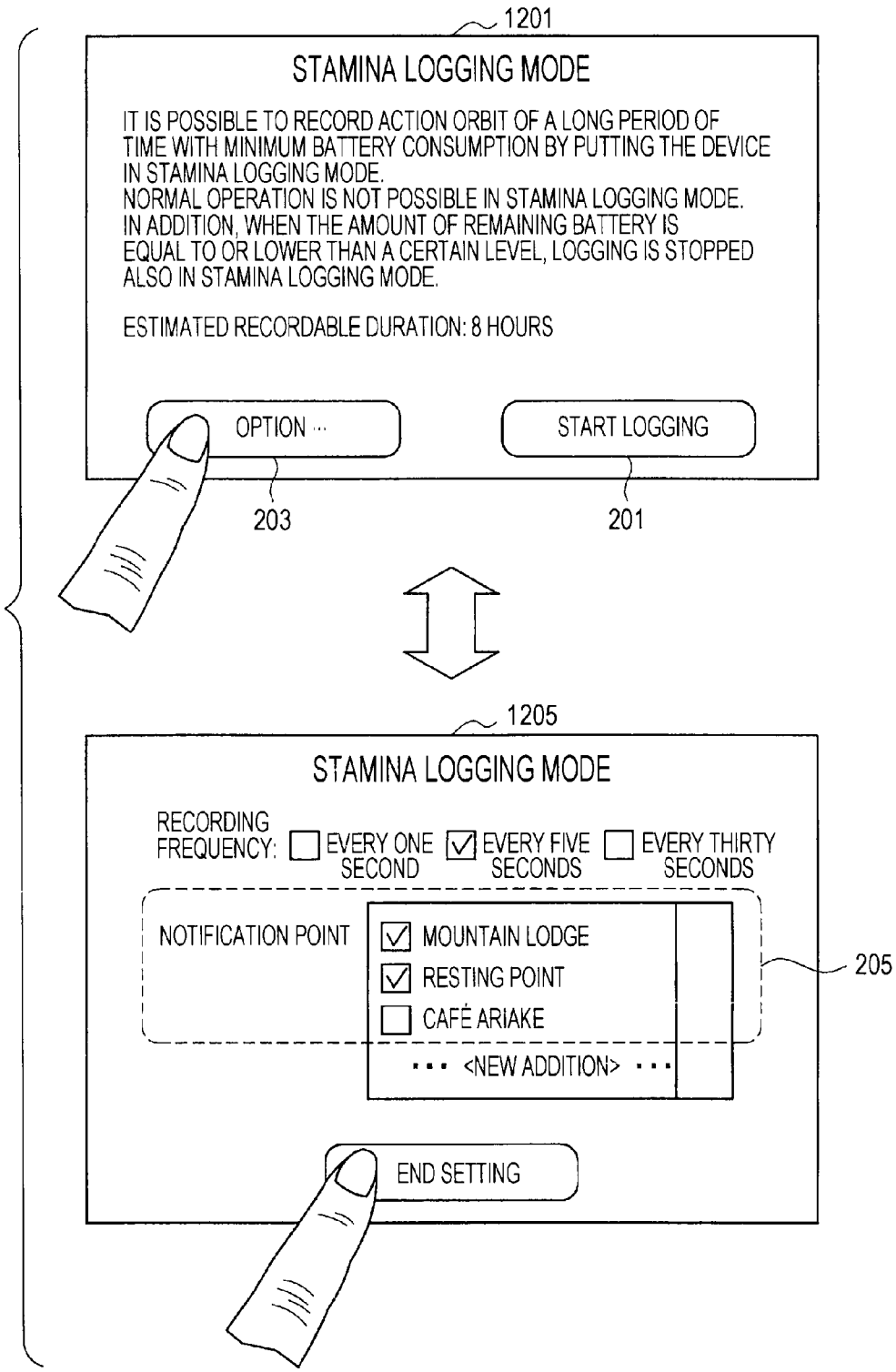
FIG. 17 is an illustrative diagram of setting of notification option of the PND according to the first embodiment.
Figure 18:
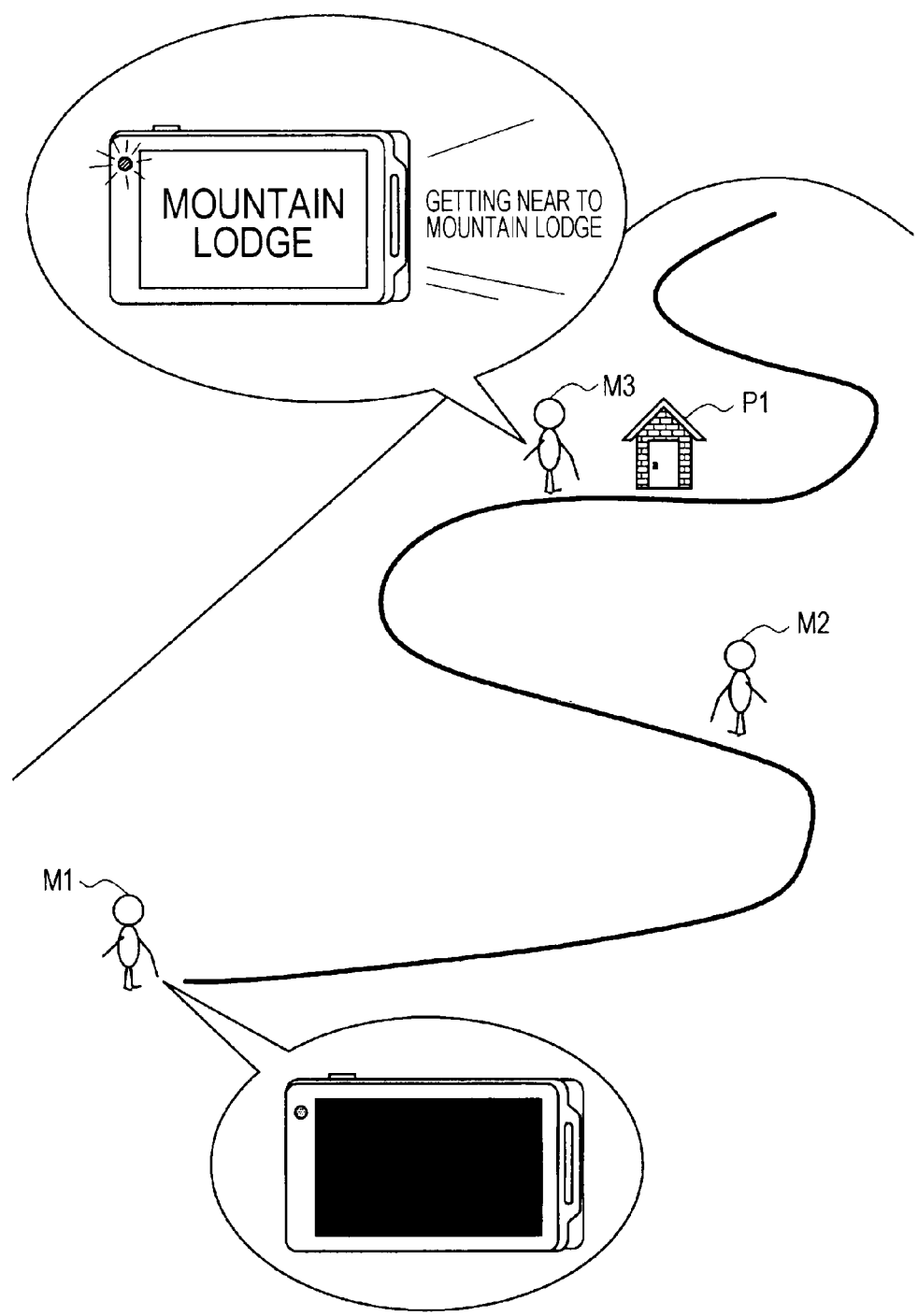
FIG. 18 is an illustrative diagram of a notification method in a notification point of the PND according to the first embodiment.
Figure 19:
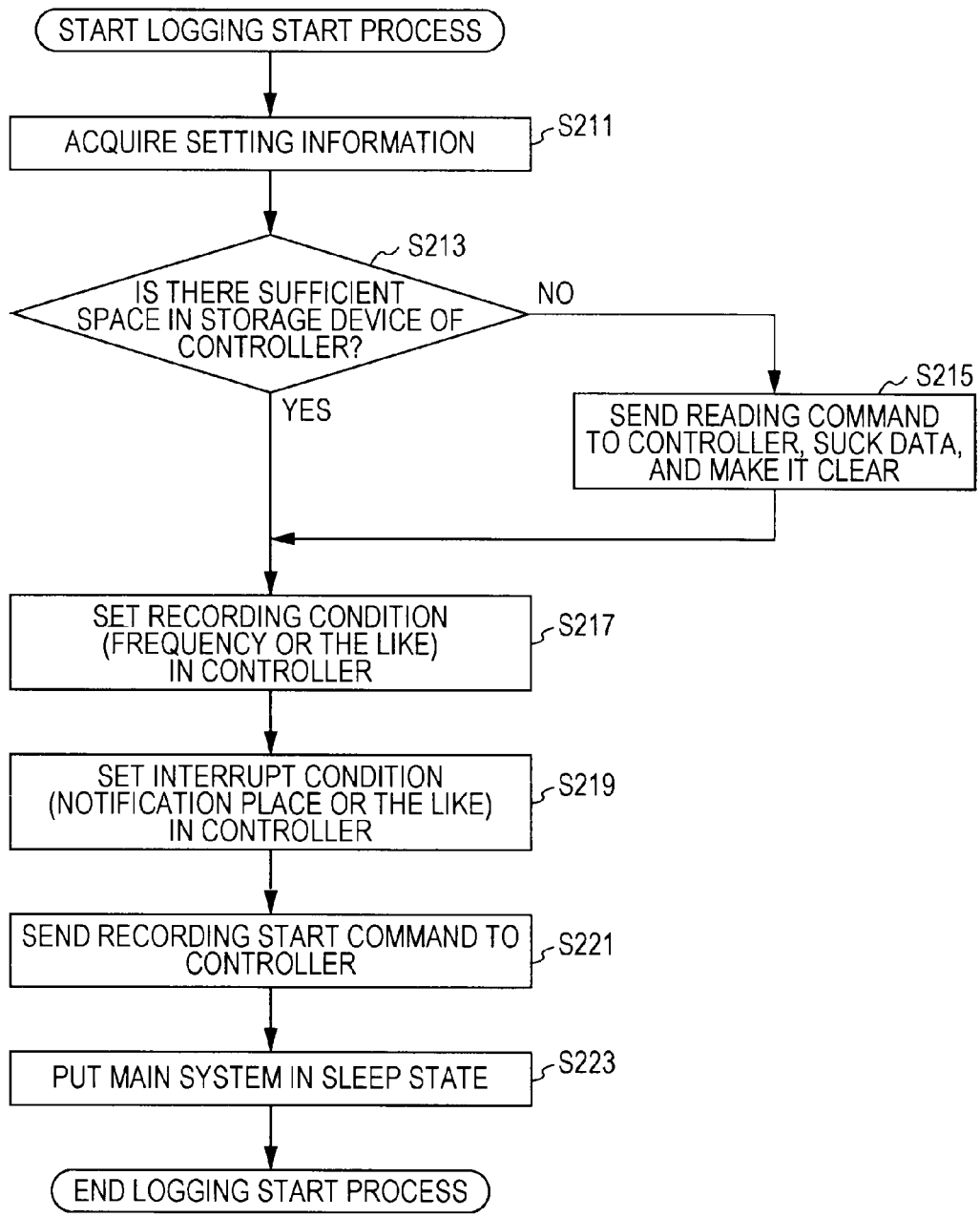
FIG. 19 is a flowchart showing an operation of a logging start process of the main system when the notification option of the PND according to the first embodiment has been set.
Figure 20:
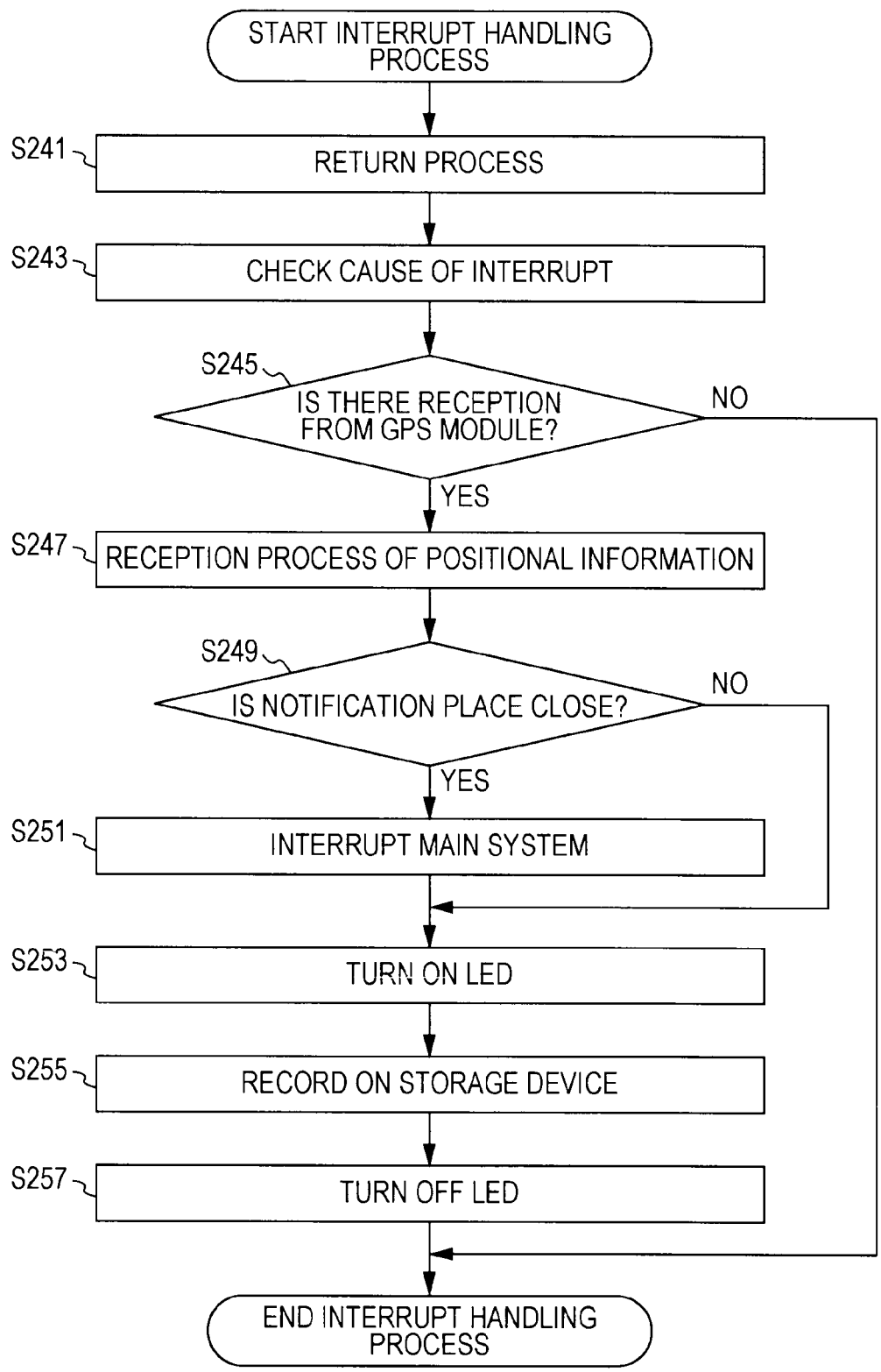
FIG. 20 is a flowchart showing an operation of an interrupt handling process of the logging controller when the notification option of the PND according to the first embodiment has been set.
Figure 21:
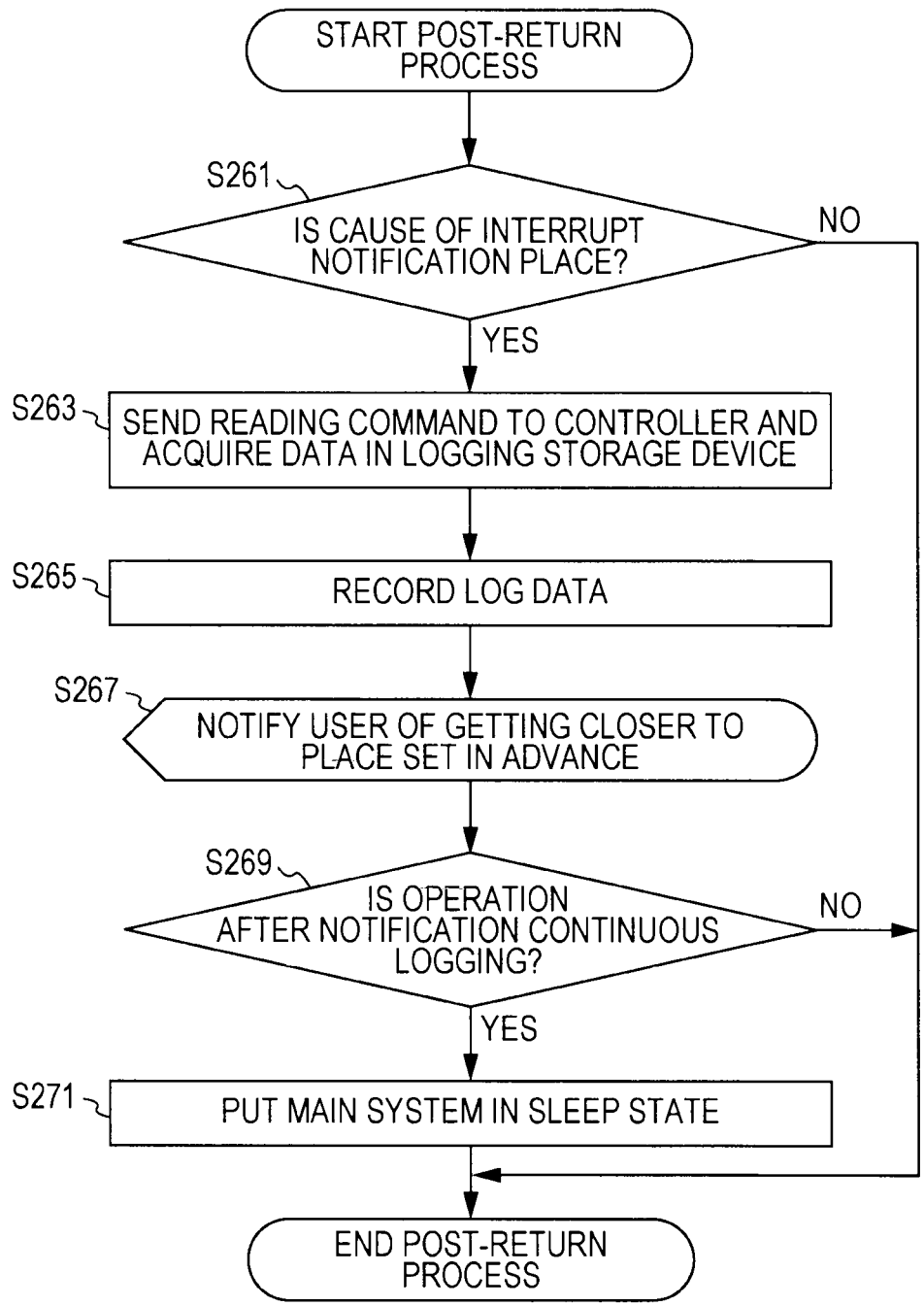
FIG. 21 is a flowchart showing an operation of a post-return process of the main system when the notification option of the PND according to the first embodiment has been set.

Next, the second operation example of the PND 10a will be described with reference to FIGS. 17 to 21. FIG. 17 is an illustrative diagram of setting of notification option of the PND according to the first embodiment. FIG. 18 is an illustrative diagram of a notification method in a notification point of the PND according to the embodiment. FIG. 19 is a flowchart showing an operation of a logging start process of the main system when the notification option of the PND according to the embodiment has been set. FIG. 20 is a flowchart showing an operation of an interrupt handling process of the logging controller when the notification option of the PND according to the embodiment has been set. FIG. 21 is a flowchart showing an operation of a post-return process of the main system when the notification option of the PND according to the embodiment has been set.

In the second operation example, the user sets a notification option before recording of the movement trace information starts in the dedicated logging mode. The notification option is a function used when the user wants to know peripheral points even when the PND 10a is operated in the dedicated logging mode.

As shown in FIG. 17, for example, the notification option is set with an operation for an option setting screen 1205 which is transited from the logging start screen 1201 by pressing down the option setting button 203 thereon. For example, before the start of logging, the user selects a point to be notified in a notification point setting area 205 of the option setting screen 1205. Then, the logging controller 103 stores positional information of the selected notification point in the logging storage device 105. While being operated in the dedicated logging mode, the logging controller 103 determines whether or not the current position of the user is near the notification point by comparing the position of the selected notification point to the positional information acquired by the GPS module 101. Then, when the current position of the user is determined to be near the notification point, the logging controller 103 notifies the user of being near the notification point using the display unit 12 and the voice output unit 106 after switching the main system 109 from the sleep state to the normal state.

FIG. 10 illustrates an example of notification. When the user is located at points of M1 and M2, the PND 10*a* is operated in the dedicated logging mode. Then, when the logging controller 103 detects that the current position is near a mountain lodge P1 set as a notification point, the PND 10*a* switches the main system 109 from the sleep state to the normal state, and notifies the user of being near the notification point through the display screen and voice output.

Hereinafter, the process of the PND 10*a* in the second operation example will be described using a flowchart only for difference from the operation of the first operation example. Referring to FIG. 19, the flow of a logging start process is shown. Since Steps S211 to S217 of FIG. 19 are the same as Steps S111 to S117 of FIG. 10, description thereof will be omitted here. In Step S219, the main system 109 sets an interrupt condition in the logging controller 103. The interrupt condition set at this moment was a voltage value in the first operation example, but in addition to that, a notification point is set in the second operation example. Hereinbelow, since the processes of Steps S221 and S223 are the same as Steps S121 and S123 of FIG. 10, description thereof will be omitted here.

Next, FIG. 20 shows the flow of the interrupt handling process in the second operation example. Since steps S241 to S247 of FIG. 20 are the same as Steps S141 to S147 of FIG. 13, description thereof will be omitted. After a reception process of positional information is executed in Step S247, the logging controller 103 determines whether or not the current position is near the notification point (S249). Then, when the current position is detected to be near the notification point, the logging controller 103 inputs an interrupt to the main system 109 (S251). On the other hand, when the current position is not near the notification point, the process of Step S251 is omitted. Hereinbelow, as the processes of Steps S253 to S257 are the same as those of Steps S149 to S153 of FIG. 13, description thereof will be omitted.

In addition, the post-return process of the main system is shown in FIG. 21. After the main system 109 is switched from the sleep state to the normal state, the main system 109 determines whether or not the cause of interrupt is in the notification point (S261). When the cause of interrupt is in the notification point, the main system 109 sends a reading command to the logging controller 103, and acquires the movement trace information in the logging storage device 105 (S263). Then, the main system 109 causes the storage unit 102 inside the main system 109 to store the acquire movement trace information (S265).

Next, the main system 109 notifies the user of getting near to the notification point set in advance. At this moment, the main system 109 can notify the user of getting near to the notification point through the display screen and voice output using, for example, the display unit 12 and the voice output unit 106. In other words, the display unit 12 and the voice output unit 106 are examples of notification units notifying the user of getting near to a notification point.

Then, the main system 109 determines whether or not an operation after notification is continuous logging (S269). The determination may be performed based on checking of, for example, prior setting information. When the operation after notification is continuous logging, the main system 109 switches the state of the main system 109 from the normal state to the sleep state.

Hereinabove the second operation example of the PND 10*a* according to the first embodiment of the disclosure has been described. According to the second operation example, when the PND 10*a* detects that the user is near the notification point that is registered in advance, the PND 10*a* can notify the information to the user. In the dedicated logging mode, the PND 10*a* is not able to use the normal navigation function. However, by using the notification option, the user can come to know that he or she is near the specific point that is set in advance.

Hereinabove, a case of mountain climbing was exemplified, but a user using the navigation function is not only a user who wants to know current positions and roads to be selected point by point. There may be a user who, for example, wants to know detailed road information only near the destination because he or she roughly knows how to get there, but does not know the detail. The function of the notification option is effective for the latter user.

<2. Second Embodiment>

[2-1. Configuration]

Figure 22:
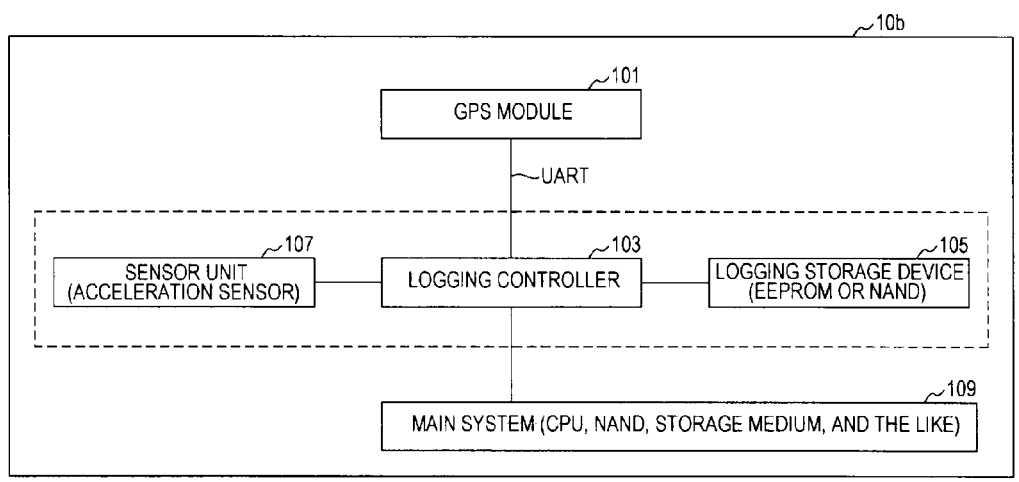
FIG. 22 is a block diagram showing a functional configuration of the PND according to the second embodiment of the disclosure.

Next, a configuration of the PND 10*b* according to a second embodiment of the disclosure will be described with reference to FIG. 22. FIG. 22 is a block diagram showing a functional configuration of the PND according to the second embodiment of the disclosure.

The PND 10*b* mainly includes the GPS module 101, the logging controller 103, the logging storage device 105, and a sensor unit 107, and the main system 109. In other words, in addition to the configuration of the PND 10*a* according to the first embodiment, the PND 10*b* further includes the sensor unit 107.

The sensor unit 107 is, for example, an acceleration sensor, a vibration sensor, or the like, and is an example of a sensing unit which senses the movement of the PND 10*b*. The PND 10*b* can be operated in a super stamina mode that saves more power when the PND 10*b* is operated in the dedicated logging mode by including the sensor unit 107.

When the logging controller 103 detects that the current position does not change for a time equal to or longer than a predetermined time based on the positional information acquired by the GPS module 101, the logging controller cuts the power supply to the GPS module 101 to stop recording of movement trace information. In addition, while the power supply to the GPS module 101 is cut, the logging controller 103 receives an interrupt from the sensor unit 107. The sensor unit 107 senses the movement of the PND 10*b*. For this reason, by supplying power again to the GPS module 101 after the logging controller 103 receives the interrupt from the sensor unit, power supply to the GPS module 101 stops during the time the PND 10*b* is static, and power consumption decreases further.

Hereinabove, an example of the function of the PND 10*b* according to the embodiment has been shown. Each constituent element described above may be constituted using general-purpose members and circuits, or may be constituted by hardware specialized in the function of each constituent element. In addition, the function of each constituent element may be performed such that a control program is read from a recording medium such as a ROM (Read Only Memory), a RAM (Random Access Memory), or the like which stores the control program in which a process procedure for realizing the function by an arithmetic device such as a CPU (Central Processing Unit) is described, and the program is interpreted and executed. Accordingly, it is possible to appropriately modify the configuration to be used according to the technical level every time the embodiment is implemented.

Furthermore, it is possible to produce a computer program for realizing each function of the PND 10*b* according to the embodiment as described above, and to load the program on a personal computer, or the like. In addition, it is possible to provide a recording medium that stores such a computer program and is readable in a computer. As such a recording medium, for example, there are a magnetic disk, an optical disc, a magneto-optical disc, a flash memory, and the like. In addition, the above-described computer program may be delivered, for example, through a network, without using a recording medium.

[2-2. Operation Mode]

Figure 23:
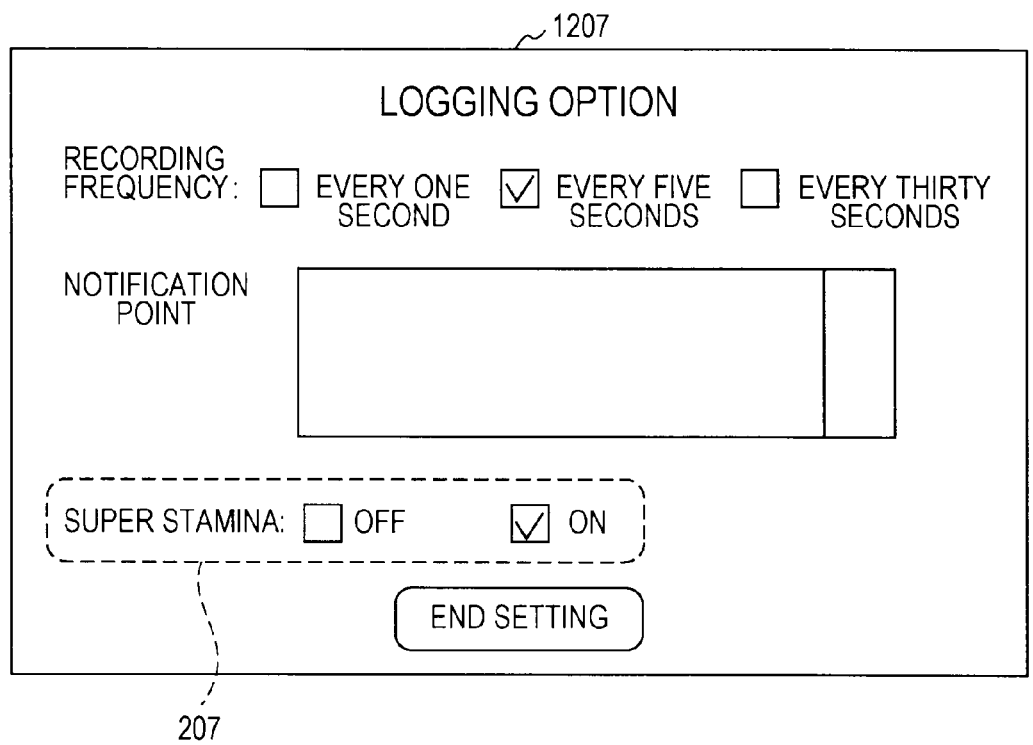
FIG. 23 is an illustrative diagram showing an option setting screen of the PND according to the second embodiment.
Figure 24:
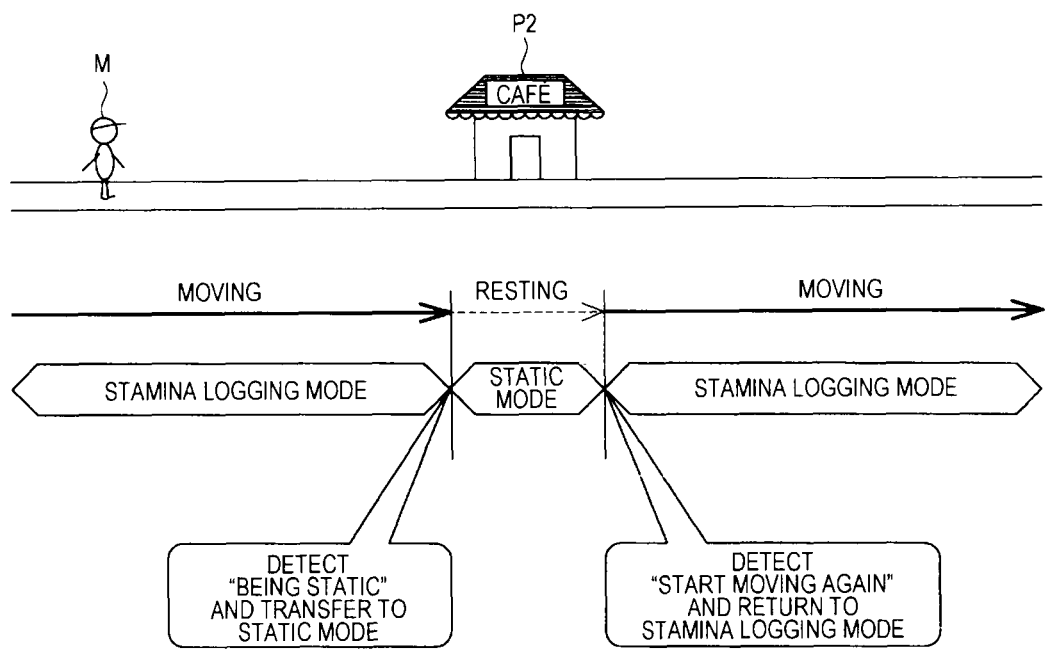
FIG. 24 is an illustrative diagram showing the overview of the option setting of the PND according to the second embodiment.
Figure 25:
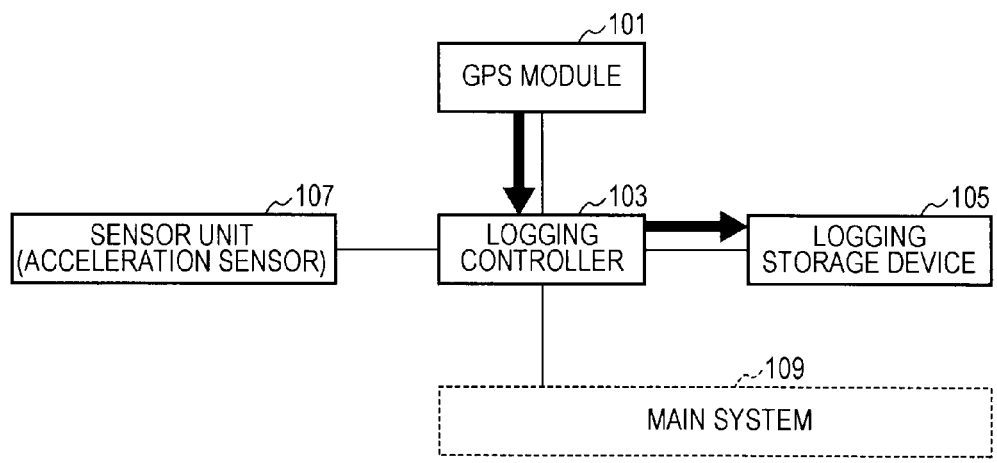
FIG. 25 is an illustrative diagram of a stamina logging mode of the PND according to the second embodiment.
Figure 26:
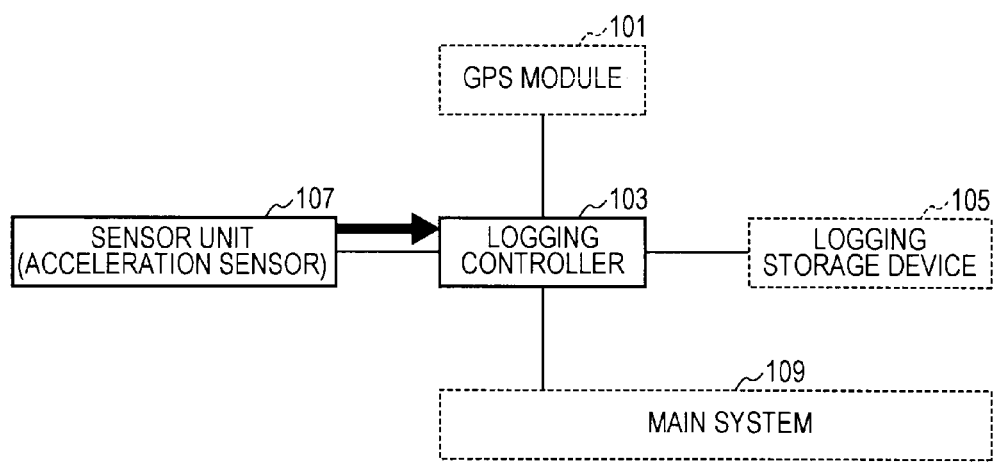
FIG. 26 is an illustrative diagram of a static mode of the PND according to the second embodiment.

Next, the operation mode of the PND 10*b* will be described with reference to FIGS. 23 to 26. FIG. 23 is an illustrative diagram showing an option setting screen of the PND according to the embodiment. FIG. 24 is an illustrative diagram showing the overview of the option setting of the PND according to the embodiment. FIG. 25 is an illustrative diagram of a stamina logging mode of the PND according to the embodiment. FIG. 26 is an illustrative diagram of a static mode of the PND according to the embodiment.

(Super Stamina Mode)

The PND 10*b* is operated in a super stamina mode by selecting the super stamina mode in, for example, a super stamina option setting area 207 of an option setting screen 1207 shown in FIG. 23. The super stamina mode is an option mode further selected in the dedicated logging mode.

The PND 10*b* operated in the super stamina mode has two operation states of a stamina logging mode and a static mode. Positional information of a user M who carries the PND 10*b* rarely changes for the time, for example, the user stays in a café P2. For this reason, recording of movement trace information stops for the resting period in the super stamina mode.

(Stamina Logging Mode)

Herein, the stamina logging mode will be described with reference to FIG. 25. The stamina logging mode is one state of the super stamina mode. The PND 10*b* is operated in the stamina logging mode while the movement of the PND 10*b* is detected based on the positional information acquired by the GPS module 101. At that moment, in the PND 10*b*, power is supplied to the GPS module 101, the logging controller 103, the logging storage device 105, and the sensor unit 107. The main system 109 is in the sleep state at that moment.

(Static Mode)

In addition, the static mode will be described with reference to FIG. 26. The static mode is one state of the super stamina mode. The PND 10*b* is switched from the stamina logging mode to the static mode if it is detected that the PND 10*b* is static based on the positional information acquired by the GPS module 101. In the static mode, the PND 10*b* stops power supply to the GPS module and the logging storage device 105. The PND 10*b* is operated in the static mode until it is detected that the PND 10*b* is moved by the sensor unit 107. The static mode can be operated with more power saved as the operation of the GPS module 101 stops.

[2-3. Operation Example]

Figure 27:
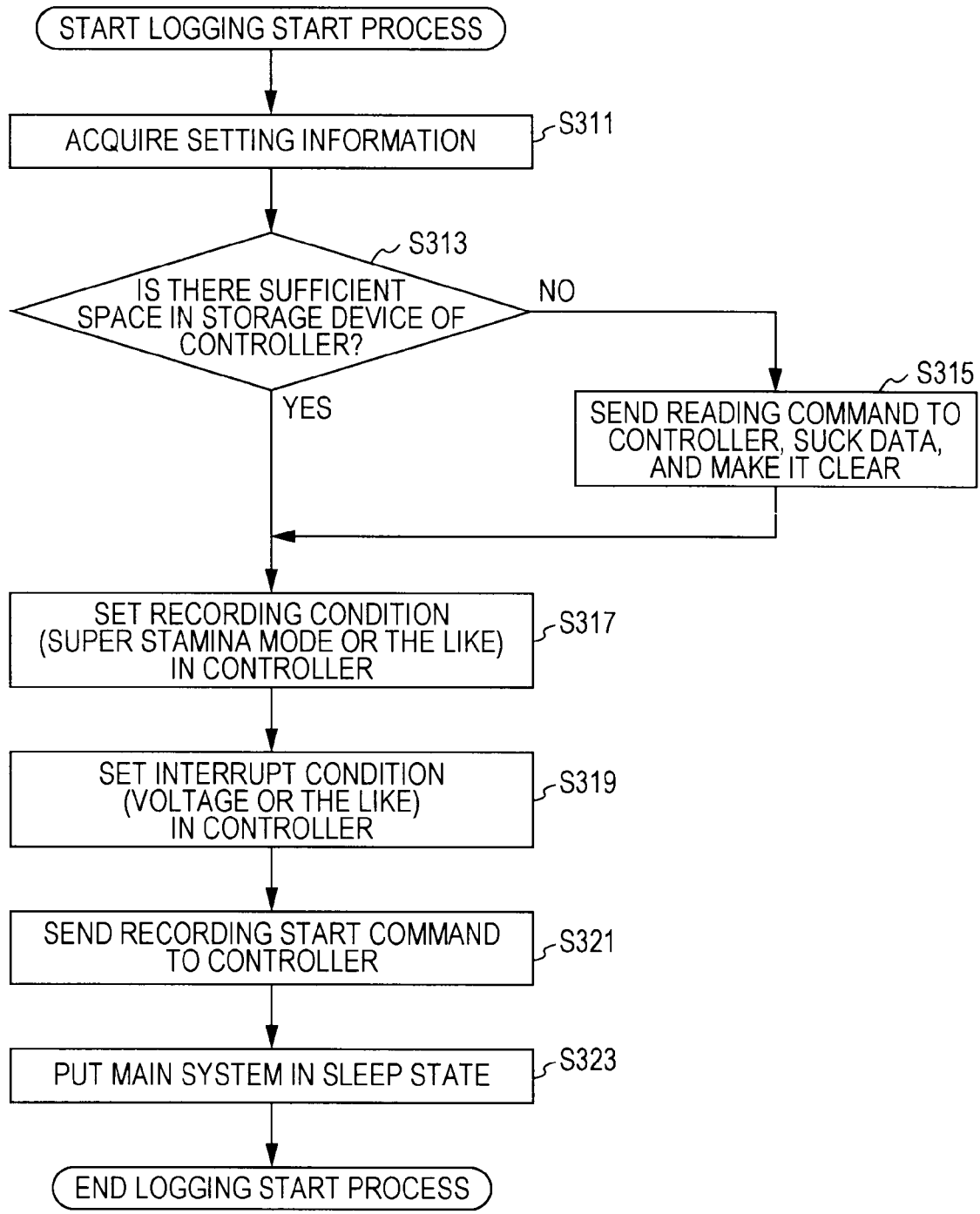
FIG. 27 is a flowchart showing an operation of a logging start process of a main system of the PND according to the second embodiment.
Figure 28:
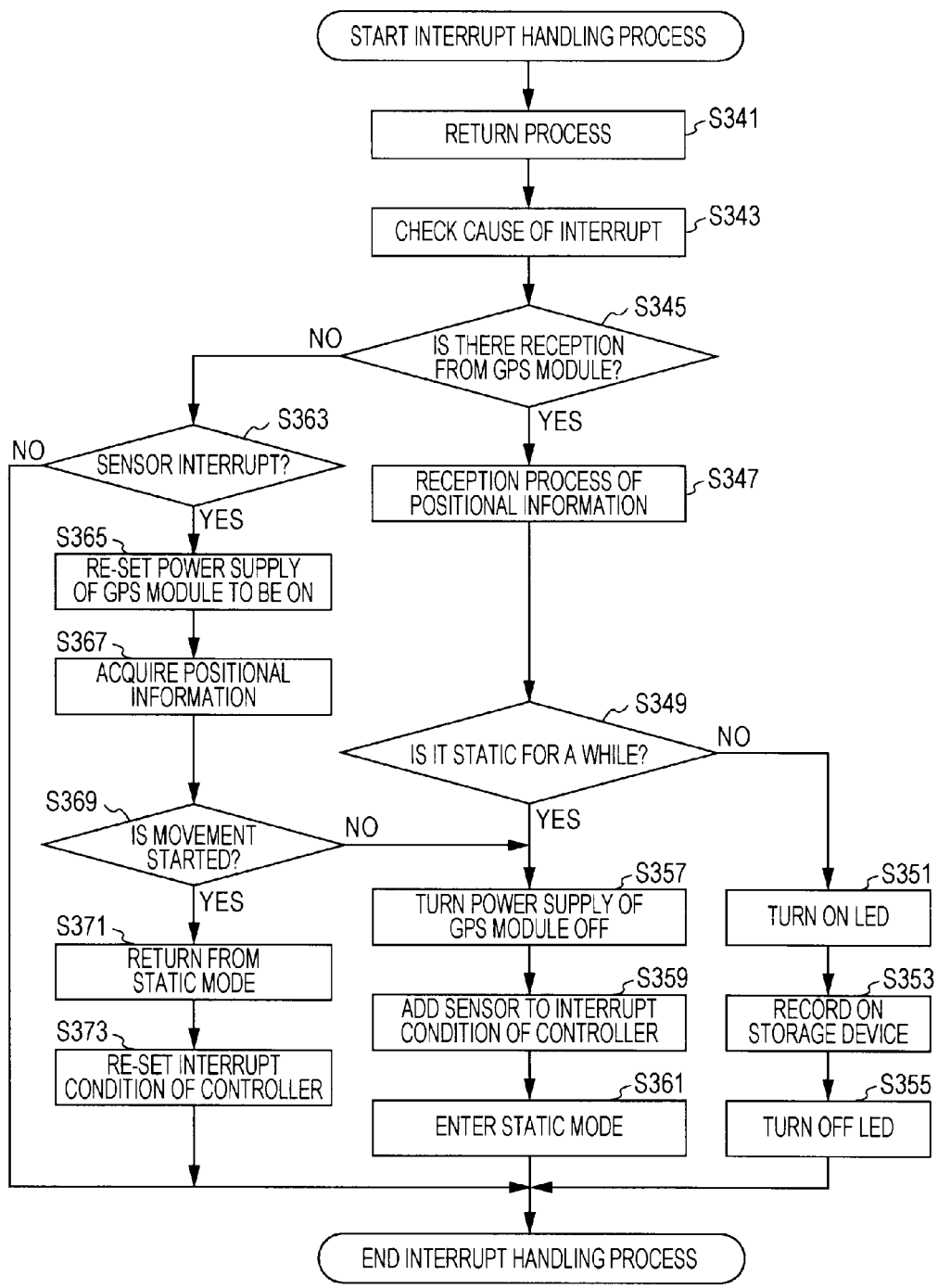
FIG. 28 is a flowchart showing an operation of an interrupt handling process of a logging controller of the PND according to the second embodiment.

Next, an operation example of the PND 10*b* will be described with reference to FIGS. 27 and 28. FIG. 27 is a flowchart showing an operation of a logging start process of the main system of the PND according to the embodiment. FIG. 28 is a flowchart showing an operation of an interrupt handling process of the logging controller of the PND according to the embodiment.

Referring to FIG. 27, the flow of the logging start process of the PND 10*b* according to the second embodiment of the disclosure is shown. Furthermore, herein, differences from the first operation example of the PND 10*a* according to the first embodiment will be mainly described, and description on the same parts will be omitted.

If each process of Steps S311 to S323 of FIG. 27 is compared to each process of Steps S111 to S123 of FIG. 10, only the process of Step S317 is different. In Step S317, the main system 109 of PND 10*b* sets a recording condition in the logging controller. At this moment, the main system 109 sets the operation in the super stamina mode in the logging controller as the recording condition. Since each process other than that of Step S317 is the same as that of FIG. 10, description thereof will be omitted here.

Furthermore, since the operation of the PND 10*b* in the ongoing logging is the same as in FIG. 12, but the interrupt handling process is different, the interrupt handling process will be described with reference to FIG. 28.

First, the logging controller 103 executes a return process in which the logging controller 103 is switched from the sleep state to the normal state (S341). Then, the logging controller 103 checks the cause of interrupt (S343). It is determined whether or not the cause of interrupt is the reception of positional information from the GPS module 101 (S345), and when it is determined that the interrupt is caused by the reception of positional information from the GPS module 101, the logging controller 103 executes a reception process of positional information (S347).

Next, the logging controller 103 determines whether or not the PND is static for a while (S349). The determination may be executed based on, for example, whether or not a state is detected, in which the positional information acquired from the GPS module 101 does not change much for a predetermined time or longer. In the determination of Step S349, when it is not detected that the PND 10*b* is static for a predetermined time or longer, a movement trace information recording process is performed as usual. In other words, after the LED is turned on (S351), the logging controller 103 records the movement trace information on the logging storage device 105 (S353), and then the LED is turned off (S355).

On the other hand, in the determination of Step S349, when it is detected that the PND 10*b* is static for a predetermined time or longer, the logging controller 103 turns the power supply to the GPD module 101 off (S357). Then, the logging controller 103 adds a sensor to the interrupt condition of the logging controller 103 (S359). Then, the logging controller 103 switches the operation mode from the stamina logging mode to the static mode and awaits interrupt from the sensor (S361).

As above, after the static mode is set, there is a case where the sensor unit 107 inputs an interrupt to the logging controller 103. In Step S345, when it is determined that the cause of interrupt is not the reception of the positional information from the GPS module 101, next, the logging controller 103 determines whether or not the cause of interrupt is the interrupt of the sensor (S363).

In the determination of Step S363, when it is determined that the cause is an interrupt of the sensor, the logging controller 103 turns the power supply of the GPS module 101 on, and re-sets the recording frequency, or the like (S365). Then, the GPS module 101 is caused to acquire positional information (S367). The logging controller 103 determines whether or not a movement is started based on the acquired positional information (S369). There may be a case, for example, where the sensor unit 107 inputs an interrupt as the sensor unit senses vibration, but the vibration is caused just by user contact with the PND 10b, and a substantial movement is not started. For this reason, in Step S369, it is determined whether or not a movement is actually started based on the positional information.

In the determination of Step S369, when a movement is not actually started, the process returns to Step S357, and the PND 10b is switched to the static mode again. On the other hand, when a movement is actually started, next, the PND 10b is switched from the static mode to the stamina logging mode (S371). Then, the logging controller 103 re-sets an interrupt condition of the logging controller 103. In other words, the logging controller 103 deletes the sensor from the interrupt condition, and adds a UART interrupt from the GPS module 101 thereto.

Hereinabove, according to the PND 10b according to the second embodiment described hitherto, further power-saving can be sought by user selection of a super stamina mode option of the dedicated logging mode. For example, for the time period when the user takes a rest in a café, or the like, the positional information does not change. For this reason, while there is no change in the positional information, it is possible to further reduce power consumption during the time period when recording is halted, by halting acquisition of the positional information by the GPS module 101 and recording of movement trace information. For this reason, the PND 10b has a sensor which senses the movement of the PND 10b. Since the GPS module 101 has functions of receiving GPS signals from a plurality of GPS satellites, and calculating the current position based on the received GPS signals, power consumption thereof is high in comparison to a sensor which just senses vibration of the PND 10b, or the like. For this reason, it is possible to seek saving of more power by turning power supply to the GPS module 101 off during the time period when recording of movement trace information is not necessary (in other words, when the position of the PND 10b does not move).

[3. Command Use Example]

Next, examples of commands of the main system 109 of the PND 10 according to the first and second embodiments of the disclosure for causing the logging controller 103 to perform a desired process will be described. With use of the commands shown below, the main system 109 can control the operation of the logging controller 103.

TABLE 1

| Command | Data | Meaning |
|---|---|---|
| SET_MODE | transparent_mode, command_mode | Switch a mode of communicating with GPS module in a transmissive manner and a mode of setting the logging controller |
| READ | Refer to annexed table | Read setting of logging controller and data |
| WRITE | Refer to annexed table | Write setting of logging controller |
| CTRL_CMD | START_LOGGING STOP_LOGGING CLEAR_POINTS BURST_READ | Start recording Stop recording Clear recorded points High-speed reading |

For example, the main system 109 can switch the operation mode of the logging controller 103 by using the command "SET_MODE" of Table 1. Herein, there are prepared a transparent mode for intermediation of communication between the GPS module 101 and the main system 109 in a transmissive manner and a command mode for executing setting of the logging controller 103. The commands are used in combination with data. For example, when the main system 109 aims to set the logging controller 103 to be in the transparent mode, the main system 109 inputs "SET_MODE transparent_mode" to the logging controller 103.

The way of using the "CTRL_CMD" command is the same. For example, the main system 109 inputs "CTRL_CMD START_LOGGING" to the logging controller 103. Then, the logging controller 103 starts recording of movement trace information. In addition, by using the "READ" command or the "WRITE" command in combination with the character strings described in the name of items in the annexed table shown below, the main system 109 can execute reading or writing of data corresponding to the character strings described in the name of items. Whether or not each item is for writing or for reading is shown in the table below. For example, "recording capacity space" is for reading, not for writing. When it is intended to examine the space of recording capacity, the main system 109 inputs "READ num_of_points_empty" to the logging controller 103.

TABLE 2

| Name of Item | Writing | Reading | Meaning of Item |
|---|---|---|---|
| num_of_points_recorded | | ○ | The number of points recorded |
| num_of_points_empty | | ○ | Space of recording capacity |
| address_of_point_to_read | ○ | ○ | Address recorded with reading point information |
| value_of_point_to_read | | ○ | Point information of the address designated above |
| record_frequency | ○ | ○ | Recording frequency |
| wakeup_conditions | ○ | ○ | Interrupt conditions in which the logging controller returns from sleep state |
| wakeup_gps_mode | ○ | ○ | Interrupt mode from the GPS module |
| wakeup_shake_threshold | ○ | ○ | The threshold value of shaking which causes an interrupt of the sensor |
| stop_voltage | ○ | ○ | Voltage with which the logging controller stops logging |
| point_to_notify_01 | ○ | ○ | Notification point 1 |
| point_to_notify_02 | ○ | ○ | Notification point 2 |
| point_to_notify_03 | ○ | ○ | Notification point 3 |

TABLE 2-continued

| Name of Item | Writing | Reading | Meaning of Item |
|---|---|---|---|
| super_stamina_enabled | ○ | ○ | Whether super stamina mode combined with shaking sensor is on. |
| threshold_for_being_still | ○ | ○ | Threshold value for determining to be still |
| threshold_for_moving | ○ | ○ | Threshold value for determining to be in action |
| points_to_clear | ○ | | Designation of points to clear (0 for all) |
| is_still_logging | | ○ | Whether or not during recording. Usually, it is not the time of reading from the logging controller. |
| led_blinking_mode | ○ | ○ | Pattern of LED blinking on and off during recording |
| burst_read_mode | ○ | ○ | Setting in high-speed reading |

Hereinabove, exemplary embodiments of the disclosure have been described in detail with reference to accompanying drawings, but the disclosure is not limited to the examples. It is obvious that a person who has general knowledge in the field of technique to which the disclosure belongs can attain various modified or amended examples within the scope of the technical gist described in Claims, and it is understood that those examples, of course, belong to the technical scope of the disclosure.

For example, in the above embodiments, the PND is assumed to have a GPS module with a function of a GPS receiver with configuration of acquiring positional information, but the disclosure is not limited to the example. For example, the PND may have a positional information acquisition unit which includes a receiver that receives Wi-Fi waves from a plurality of base stations and a current position calculation unit that calculates the current position based on the received Wi-Fi waves. Herein, the current position calculation unit estimates the distance between the receiver and each base station based on the reception intensity of the received Wi-Fi waves. In addition, the current position calculation unit calculates the current position based on the principle of triangulation using the estimated distance to each base station and positional information thereof.

In addition, the PND may further have a relative positional information acquisition unit which acquires the relative position based on detection values of various sensors. For example, the relative positional information acquisition unit may include a gyro sensor which detects an angle velocity, an acceleration sensor which detects acceleration, and a geomagnetic sensor which detects geomagnetism.

In addition, in the above-described embodiments, a GPS is exemplified as an example of a positioning satellite. The positioning satellite, however, is not limited to a GPS. The positioning satellite may be various kinds of positioning satellites including Galileo, GLONASS, Beido, Michibiki, and the like. In that case of the positioning satellite, one kind of satellite may be used, or positioning signals from a plurality of kinds of satellites may be used in combination. It is possible to appropriately modify the configuration to be used for acquiring positional information according to the technical level of every implementation.

In addition, in the above-described embodiments, the PND is exemplified as a specific example of an information processing device. However, the disclosure is not limited to the example. The information processing device may be various kinds of electronic equipment which has the configuration of acquiring positional information and is driven by batteries. For example, the information processing device may be an information processing device including a mobile telephone, a portable music reproduction device, a portable video processing device, a portable game device, a PDA (Personal Digital Assistant), a notebook PC (Personal Computer), or the like.

In addition, in the above-described embodiments, the battery of the information processing device has not been specifically mentioned, but the GPS module 101, the logging controller 103, the logging storage device 105, and the main system 109 may share the same battery. Alternatively, the GPS module 101, the logging controller 103, the logging storage device 105, and the main system 109 may use different and independent batteries.

Furthermore, in the present specification, the steps described in the flowcharts include not only processes performed in time series along the described order, but also processes executed in parallel or individually, not including processes necessarily performed in time series. In addition, it is needless to say that the order of the steps processed in time series can be appropriately changed depending on cases.

The present disclosure contains subject matter related to that disclosed in Japanese Priority Patent Application JP 2010-257242 filed in the Japan Patent Office on Nov. 17, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
a single housing;
a main function unit, within the single housing, including a CPU and a storage medium, and which realizes main functions of the information processing device and is operated by being switched between a normal operation mode and a power-saving mode in which less power is consumed than in the normal operation mode;
a position acquisition unit, within the single housing, which acquires positional information indicating a current position of the information processing device; and
a logging controller, within the single housing, which causes a logging storage unit, which includes an independent storage area from the main function unit, to record movement trace information obtained by making the positional information acquired by the position acquisition unit correspond to the time when the positional information is acquired in the state where the main function unit is switched to the power-saving mode, and wherein in the normal operation mode no power is supplied to the logging storage unit so the logging storage unit is not used in the normal operation mode, and in the normal operation the positional information is input to the storage medium of the main function unit through the logging controller without being stored in the logging storage unit.

2. The information processing device according to claim 1, further comprising:
a detection unit, within the single housing, which includes a sensor that senses movement of the information processing device,
wherein, when the logging controller detects that the current position is not changed for a predetermined time or longer based on the positional information acquired by the position acquisition unit, the logging controller stops recording of the movement trace information by cutting power supply to the position acquisition unit until the detection unit detects the movement of the information processing device.

3. The information processing device according to claim 1, wherein the logging controller is operated by being switched between a first operation mode in which recording of the movement trace information is executed and a second operation mode which consumes lower power than the first operation mode and is used when recording of the movement trace information is not performed.

4. The information processing device according to claim 1, further comprising, within the single housing, a light emitting unit which turns on and off in a cycle according to recording frequency of the movement trace information.

5. The information processing device according to claim 1, wherein the main function unit sets information of a notification point in the logging controller before the main function unit is switched to the power saving mode, and
wherein the logging controller switches the main function unit to the normal operation mode when the current position of the information processing device gets near to the notification point within a predetermined range.

6. The information processing device according to claim 5, wherein, when the main function unit is switched to the normal operation mode after the logging controller detects that the current position is within the predetermined range of the notification point, the main function unit includes a notification unit which notifies that the current position gets near to the notification point.

7. The information processing device according to claim 1, wherein, when the main function unit is switched to the normal operation mode after the logging controller records the movement trace information in the power-saving mode, the main function unit causes a screen including an analysis result of the movement trace information stored in the logging storage unit to be displayed.

8. The information processing device according to claim 1, wherein, when a space capacity of the logging storage unit is equal to or less than a predetermined threshold value before the main function unit is switched to the power-saving mode, the main function unit duplicates and stores the movement trace information stored in the logging storage unit in the storage medium of the main function unit, and erases the movement trace information stored in the logging storage unit.

9. A position recording method comprising:
setting an acquisition frequency of movement trace information obtained by making positional information indicating a current position corresponding to a time when the positional information is acquired in a logging controller by a main controller included in a main function unit, within a single housing, including a CPU and a storage medium, and which realizes main functions of an information processing device and is operated by being switched between a normal operation mode and a power-saving mode in which less power is consumed than in the normal operation mode;
switching the main function unit to the power-saving mode by the main controller;
acquiring the positional information by the logging controller, within the single housing, in the state where the main function unit is switched to the power-saving mode; and
causing the movement trace information to be recorded in a logging storage area, within the single housing, which includes an independent storage area from the main function unit, by the logging controller based on the acquired positional information, and wherein in the normal operation mode no power is supplied to the logging storage unit so the logging storage unit is not used in the normal operation mode, and in the normal operation the positional information is input to the storage medium of the main function unit through the logging controller without being stored in the logging storage unit.

10. A non-transitory computer readable storing computer executable instructions which cause a computer to function as an information processing device comprising:
a single housing;
a main function unit, within the single housing, including a CPU and a storage medium, and which realizes main functions of the information processing device and is operated by being switched between a normal operation mode and a power-saving mode in which less power is consumed than in the normal operation mode;
a position acquisition unit, within the single housing, which acquires positional information indicating a current position of the information processing device; and
a logging controller, within the single housing, which causes a logging storage unit, which includes an independent storage area from the main function unit, to record movement trace information obtained by making the positional information acquired by the position acquisition unit correspond to the time when the positional information is acquired in the state where the main function unit is switched to the power-saving mode, and wherein in the normal operation mode no power is supplied to the logging storage unit so the logging storage unit is not used in the normal operation mode, and in the normal operation the positional information is input to the storage medium of the main function unit through the logging controller without being stored in the logging storage unit.

* * * * *